United States Patent
Obeid

(10) Patent No.: US 8,234,221 B2
(45) Date of Patent: *Jul. 31, 2012

(54) RECRUITMENT VENDOR MANAGEMENT SYSTEM AND METHOD

(75) Inventor: Diya B. Obeid, New York, NY (US)

(73) Assignee: JobDiva, Inc., New York, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/626,772

(22) Filed: Nov. 27, 2009

(65) Prior Publication Data

US 2010/0076986 A1    Mar. 25, 2010

Related U.S. Application Data

(63) Continuation of application No. 10/679,432, filed on Oct. 7, 2003, now Pat. No. 7,650,286, which is a continuation-in-part of application No. 10/418,142, filed on Apr. 18, 2003, now Pat. No. 7,711,573.

(51) Int. Cl.
*G06Q 10/00* (2012.01)
(52) U.S. Cl. ........................................................ 705/321
(58) Field of Classification Search .................. None
See application file for complete search history.

(56) References Cited

U.S. PATENT DOCUMENTS

| | | | |
|---|---|---|---|
| 5,832,497 A | 11/1998 | Taylor | |
| 6,049,776 A | 4/2000 | Donnelly et al. | |
| 6,266,659 B1 | 7/2001 | Nadkarni | |
| 6,374,259 B1 | 4/2002 | Celik | |
| 6,408,337 B1 | 6/2002 | Dietz et al. | |
| 2001/0056422 A1 | 12/2001 | Benedict, Jr. et al. | |
| 2002/0002479 A1 | 1/2002 | Almog et al. | |
| 2002/0002563 A1 | 1/2002 | Bendik | |
| 2002/0046074 A1 | 4/2002 | Barton | |
| 2002/0046224 A1 | 4/2002 | Bendik | |

OTHER PUBLICATIONS

"B2Secure Hiring Management System Features", product features [online], B2Secure, Inc., 2003 [1 page retrieved on Mar. 5, 2003]. Retrieved from the Internet: <http://www.b2secure.com/features.asp>.

"Monster Office HQ—Monster", web page [online], Monster, 2002 [2 pages retrieved on Mar. 4, 2003]. Retrieved from the Internet: <http://recruiter.monster.com/sourcing/resumesearch.asp>.

(Continued)

*Primary Examiner* — Jonathan Ouellette
(74) *Attorney, Agent, or Firm* — Kenneth P. Waszkiewicz

(57) ABSTRACT

A computer system and method for identifying a matching resume for a job description. The system receives and stores the job description that includes job requirements, each including a required skill or experience-related phrase and a required term of experience. The system receives and stores resumes that include skill or experience-related phrases. When the skill or experience-related phrases include the required skill or experience-related phrase for a job requirement, the system computes a term of experience for the required skill or experience-related phrase. To compute the term of experience, the system associates a contextual use and an experience range with each skill or experience-related phrase. A resume is a match when it includes the required skill or experience-related phrase for each job requirement and the term of experience for the required skill or experience-related phrase in the resume is greater than or equal to the required term of experience.

4 Claims, 6 Drawing Sheets

OTHER PUBLICATIONS

"Talent Match search", web page [online], Dice, Inc., 1991-2003 [2 pages retrieved on Mar. 4, 2003]. Retrieved from the Internet: http://employer.dice.com/talentmatch/index.jsp?jan=721>.

"Dice—Job Search for Technology Professionals", web page [online], Dice, Inc., 1991-2003 [3 pages retrieved on Mar. 13, 2002]. Retrieved from the Internet: <http://seeker.dice.com/seeker.epl?rel_code=1102>.

"Sourcer Products—Wizard Workshop Tip: Synonym Management", article [online], Young Associates, Inc., 1998-2002 [2 pages retrieved on Mar. 5, 2003]. Retrieved from the Internet: <http://www.sourcer.com/tip2.html>.

"Sourcer Products—Wizard Workshop Tip: Stop Searching!", article, [online], Young Associates, Inc., 1998-2002 [4 pages retrieved on Mar. 5, 2003]. Retrieved from the Internet: <http://www.sourcer.com/tip3.html>.

"Sourcer: Download a Tour of Sourcer", demonstration program [online], Sourcer Products, 1998-2003 [3 page retrieved on Mar. 5, 2003]. Retrieved from the Internet: <http://www.sourcer.com/downloads.html>.

"Peopleclick Solutions clickXg Recruitment Management", product features [online], Peopleclick, Inc., 2003 [1 page retrieved on Mar. 6, 2003]. Retrieved from the Internet: <http://www.peopleclick.com/solutions/recruitment.asp>.

"WinSearch—Recruiting Software—Simplified Resume Processing from Relational Syste . . . " product features [online], Relational Systems, Inc., 2002 [1 page retrieved on Mar. 6, 2003]. Retrieved from the Internet: <http://www.winsearch.com/xq/ASP/qx/ws3.htm>.

"Winsearch—Recruiting Software—Workflow Management from Relational Systems, Inc.", product features [online], Relational Systems, Inc., 2002 [2 pages retrieved on Mar. 6, 2003]. Retrieved from the Internet: <http://www.winsearch.com/xq/ASP/qx/ws1.htm>.

"Member Workstation—Tell Me More About Power/Profile Search", web page [online], Internet Association Group, Inc., 2003 [2 pages retrieved on Mar. 4, 2003]. Retrieved from the Internet: <http://www.computerwork.com/cfm-bin/member_area/resume_search.cfm?id=2766>.

"Member Workstation—Tell Me More About Web Search", web page [online], Internet Association Group, Inc., 2003 [1 page retrieved]. Retrieved from the Internet.

"Computerwork.com Resume Getter—Tell Me More About Resume Getter", web page [online], Internet Association Group, Inc., 1996-2002 [1 page retrieved]. Retrieved from the Internet.

"www.computerwork.com Resume Submission for Computer Professionals", web page [online], Internet Association Group, Inc., 2003, [2 pages retrieved on Mar. 4, 2003]. Retrieved from the Internet: <http://www.computerwork.com/cfm-bin/newresume/enter_resume.cfm>.

"JobWarehouse.com: Resume Search", web page [online], JobWarehouse.com, Inc., 1997-2003 [1 page retrieved on Mar. 4, 2003]. Retrieved from the Internet: <http://www.jobwarehouse.com/jws/secure/search.cfm>.

"JobWarehouse.com: Passive Resume Search", web page [online], JobWarehouse.com, Inc., 1997-2003 [1 page retrieved on Mar. 4, 2003]. Retrieved from the Internet: <http:passive.jobwarehouse.com/search/servlet/pdc?jwession=857E550CEE4CCB2EBDAFAB9C95AC...>.

"Icarian Employee Acquisition", product features [online], Icarian [2 pages retrieved on Mar. 4, 2003]. Retrieved from the Internet: <http://www.icarian.com/products/icarian_ea.html>.

"Interactive Job Site—Connecting with Candidates", datasheet [online], Icarian [2 pages retrieved]. Retrieved from the Internet.

"Icarian Resume Management", product features [online], Icarian [1 page retrieved]. Retrieved from the Internet.

"Icarian Products—Job Board Posting", product features [online], Icarian [1 page retrieved on Mar. 4, 2003]. Retrieved from the Internet: <http://www.icarian.com/products/job_board.html>.

"PureCarbon—JobPlanet by PureCarbon", product features [online], [2 pages retrieved on Mar. 4, 2003]. Retrieved from the Internet: <http://www.purcarbon.com/jp.shtml>.

"Search Resumes", web page [online], Net Temps [1 page retrieved]. Retrieved from the Internet.

"Power Search Resumes", web page [online], Net Temps [1 page retrieved on Mar. 4, 2003]. Retrieved from the Internet: <http://desk.net-temps.com/search_power.html>.

"Hot.Jobs.com Person Search", web page [online], Yahoo! [2 pages retrieved on Mar. 4, 2003]. Retrieved from the Internet: <http://member.hotjobs.com/member/cgi-bin/user-show?TEMPLATE=/member/htdocs/quick-search.html>.

"HotJobs.com Person Search", web page [online], Yahoo! [3 pages retrieved on Mar. 4, 2003]. Retrieved from the Internet: <http://member.hotjobs.com/member/cgi-bin/user-show?TEMPLATE=/member/htdocs/person-search-pag...>.

"New and Improved Hotjobs Desktop", product features [online], Yahoo! [1 page retrieved]. Retrieved from the Internet.

"Yahoo! Resumix", product features [online], Yahoo! [2 pages retrieved]. Retrieved from the Internet: <http://enterprise.yahoo.com/resumix>.

"Yahoo! Enterprise Solutions—Resumix—Resumix 6", product features [online], Yahoo! Inc., 2003 [3 pages retrieved on Mar. 4, 2003]. Retrieved from the Internet: <http://enterprise.yahoo.com/resumix/recruiting/resumix6/>.

"Yahoo! Enterprise Solutions—Resumix—Resumix 6—Product Tour—3. Creating a Requisition", product features [online], Yahoo!, Inc. 2003 [1 page retrieved]. Retrieved from the Internet.

"Yahoo! Enterprise Solutions—Resumix—Resumix 6—Product Tour—4. Searching for Matching Resumes", product features [online], Yahoo!, Inc., 2003 [1 page retrieved on Mar. 4, 2003]. Retrieved from the Internet: <http://enterprise.yahoo.com/resumix/recruiting/resumix6/tour/resumix_tour4.html>.

"Yahoo! Enterprise Solutions—Resumix—Resumix 6—Product Tour—5. Viewing the Resume matches List", product features [online], Yahoo! Inc., 2003 [1 page retrieved]. Retrieved from the Internet.

"Yahoo! Enterprise Solutions—Resumix—Resumix 6—Product Tour—6. Viewing the.Candidate's Resume Summary", product features [online], Yahoo! Inc., 2003 [1 page retrieved]. Retrieved from the Internet.

"Yahoo! Enterprise Solutions—Resumix—Resumix 6—Product Tour—7. Organize Your Work Your Way", product features [online], Yahoo! Inc., 2003 [1 page retrieved on Mar. 4, 2003]. Retrieved from the Internet: <http://enterprise.yahoo.com/resumix/recruiting/resumix6/tour/resumix_tour.7.html>.

"Computerjobs.com—Resumes by Skill Search", web page [online], Computer Jobs.com, Inc., 1995-2003 [3 pages retrieved on Mar. 4, 2003]. Retrieved from the Internet: <http://www.employers.computerjobs.com/client/resume_drilldown.cfm>.

"Computerjobs.com—Classic Keyword Search", web page [online], Computer Jobs.com, Inc., 1995-2003 [3 pages retrieved on Mar. 4, 2003]. Retrieved from the Internet: <http://www.employers.computerjobs.com/client/ResumeSearchClassic.dbm>.

"Computerjobs.com—Standard Keyword Search", web page [online], Computer Jobs.com, Inc., 1995-2003 [3 pages retrieved on Mar. 4, 2003]. Retrieved from the Internet: <http://www.employers.computerjobs.com/client/ResumeSearchStandard.asp>.

"Computerjobs.com—Resume Search", web page [online], Computer Jobs.com [3 pages retrieved on Mar. 4, 2003]. Retrieved from the Internet: <http://www.employers.computerjobs.com/client/resume_search.aspx>.

"Member Candidate Search—FlipDog.com", web page [online], FlipDog.com, 2000-2003 [1 page retrieved on Mar. 4, 2003]. Retrieved from the Internet: <http://www.flipdog.com/emp/emp-search.html>.

"Web Candidate Search—FlipDog.com", web page [online], FlipDog.com, 2000-2003 [1 page retrieved]. Retrieved from the Internet.

"Job Seeker Registration—FlipDog.com", web page [online], FlipDog.com, 2000-2003 [2 pages retrieved on Mar. 4, 2003]. Retrieved from the Internet: <http://www.flipdog.com/skr/register.html;jsessionid=4ZPL5J55X40TLQFIC2USF3Q?DPSLogout=true&_re...>.

"HireAbility.com—Ability Search", web page [online], HireAbility.com [1 page retrieved on Mar. 4, 2003]. Retrieved from the Internet: <http://www.hireability.com/abilitysearch.html>.

"Sarah at Your Side—Profile—Upload Résumé", web page [online], [1 page retrieved]. Retrieved from the Internet.

"Sarah at Your Side—Candidate Search", web page [online], [1 page retrieved]. Retrieved from the Internet.

"HireAbility.com—New XML Technology Makes Online Job Searching a Snap", article [online], HireAbility.com, LLC, 1997-2003 [2 pages retrieved on Mar. 4, 2003]. Retrieved from the Internet: <http://www.hireability.com/PR_5.14.01.html>.

"HireAbility.com—Meet Sarah", product features [online], HireAbility.com, LLC, 1997-2003.[1 page retrieved on Mar. 4, 2003]. Retrieved from the Internet: <http://www.hireability.com/sarah.html>.

"HireAbility.com—Resume Processing", product features [online], HireAbility.com, LLC, 1997-2003 [2 pages retrieved on Feb. 25, 2003]. Retrieved from the Internet: <http://www.hireability.com/rezprocessing.html>.

"Tri-State Jobs—Search the Resume Database—Resume Power Search", web page [online], Tri-State Jobs [1 page retrieved on Mar. 4, 2003]. Retrieved from the Internet: <http://www.tristatejobs.com/cgi-bin/page.pl?page=res_quick_search&userID=darzi&password=darzi&id=10...>.

"Tri-State Jobs—Search the Resume Database", web page [online], Tri-State Jobs, 1996-2002 [2 pages retrieved on Mar. 4, 2003]. Retrieved from the Internet: <http://www.tristatejobs.com/cgi-bin/page.pl?page=resume_power_search&userID=darzi&password=darzi&i...>.

"Post Your Resume to Tri-State Database", web page [online], Tri-State Jobs, 1996-2002 [4 pages retrieved on Mar. 10, 2003]. Retrieved from the Internet: <http://www.tristatejobs.com/add_resume.html>.

"Find Resumes at CareerBuilder—Search 6 Million Current Resumes of Active, Quality Job Seekers", web page [online], CareerBuilder.com [2 pages retrieved on Mar. 4, 2003]. Retrieved from the Internet: <http://www.careerbuilder.com/JobPoster/Resumes/resfind.asp>.

"CareerBuilder (add Resume)", web page [online], CareerBuilder.com, [3 pages retrieved on Mar. 4, 2003]. Retrieved from the Internet: <http://www.careerbuilder.com/jobseeker/resumes/editresume.asp?verb=add>.

"iGreentree Web Search", product features [online], Greentree Systems, Inc. [1 page retrieved]. Retrieved from the Internet.

"Greentree Products and Services", product features [online], Greentree Systems, Inc. [1 page retrieved on Mar. 4, 2003]. Retrieved from the Internet: <http://www.greentreesystems.com/EProducts/EProductFrameSet.htm>.

"Resume Processor with iGreentree", product features [online], Greentree Systems, Inc. [1 page retrieved on Mar. 5, 2003]. Retrieved from the Internet: <http://www.greentreesystems.com/Products/resproc.htm>.

"ScanSation", product features [online], Greentree Systems, Inc. [1 page retrieved]. Retrieved from the Internet.

"Applicant Self-Entry Sample Screens", product features [online], Greentree Systems, Inc. [4 pages retrieved on Mar. 5, 2003]. Retrieved from the Internet: <http://www.greentreesystems.com/Products/ASESampleScreens.htm>.

"Applicant Self-Entry", product features [online], Greentree Systems, Inc. [1 page retrieved]. Retrieved from the Internet.

"Greentree Employment System for Windows Overview", product features [online], Greentree Systems, Inc. [4 pages retrieved on Mar. 5, 2003]. Retrieved from the Internet: <http://www.greentreesystems.com/Products/Overview.htm>.

"HRsmart | Online Recruiting & Applicant Tracking", product features [online], HRsmart, 1996-2003 [2 pages retrieved on Mar. 5, 2003]. Retrieved from the Internet: <http://www.hrsmart.com/ats.html>.

"Recruiting Software | RecruitMAX Web Based Enterprise Recruiting Software, Staffing soft . . .", product features [online], Recruitmax [2 pages retrieved on Mar. 5, 2003]. Retrieved from the Internet: <http://www.recruitmax.com/products/pro/keys.cfm>.

"Recruiting Software | RecruitMAX Web Based Enterprise Recruiting Software, Staffing soft . . . ", product features [online], Recruitmax [2 pages retrieved on Mar. 5, 2003]. Retrieved from the Internet: <http://www.recruitmax.com/services/resumeprocessing.cfm>.

"eRecruiting and Staffing Solutions: Applicant Tracking and Recruiting Software—erecruiter", product features [online], Xperius, 2003 [2 pages retrieved on Mar. 5, 2003]. Retrieved from the Internet: <http://www.xperius.com/solutions/eRecruiter.cfm>.

"eRecruiting and Staffing Solutions: Applicant Tracking and Recruiting Software—workflow", product features [online], NAME/DATE [2 pages retrieved on Mar. 5, 2003]. Retrieved from the Internet: <http://www.xperius.com/solutions/workflow.cfm>.

"eRecruiting and Staffing Solutions: Applicant Tracking and Recruiting Software—ezaccess", product features [online], Xperius, 2003 [1 page retrieved on Mar. 5, 2003]. Retrieved from the Internet: <http://www.xperius.com/solutions/ezaccess50.cfm>.

"AIRS Products—AIRS SearchStation 7.0", product features [online], AIRS, 2003 [2 pages retrieved on Mar. 5, 2003]. Retrieved from the Internet: <http://www.airsdirectory.com/products/technologies/searchstation/>.

"Tools—AIRS—SearchStation—Resumes", web page [online], AIRS, 2003 [1 page retrieved on Mar. 5, 2003]. Retrieved from the Internet: <http://www.airsdirectory.com/tools/searchstation/>.

"SonicRecruit: For Recruiters", product features [online], Cytiva, Inc., 2001 [2 pages retrieved on Mar. 5, 2003]. Retrieved from the Internet: <http://www.sonicrecruit.com/hrprofessionals/index.html>.

"SonicRecruit: For HR Key Features", product features [online], Cytiva, Inc., 2001 [2 pages retrieved on Mar. 5, 2003]. Retrieved from the Internet: <http://www.sonicrecruit.com/hrprofessionals/features.html>.

"SonicRecruit: For Recruiters", product features [online], Cytiva, Inc., 2001 [1 page retrieved on Mar. 5, 2003]. Retrieved from the Internet: <http://www.sonicrecruit.com/recruiters/index.html>.

"Bond International Software (AdaptRecruitment Product Features)", product features [online], Bond International Software, 2002 [3 pages retrieved on Mar. 6, 2003]. Retrieved from the Internet: <http://www.bondadapt.com/Products.asp?subpage=Recruitment_Prod>.

"iCIMS—iRecruiter: Resume Acquisition", product features [online], iCIMS, 1999-2003 [1 page retrieved on Mar. 6, 2003]. Retrieved from the Internet: <http://www.icims.com/products/irecruiter/acquistion.asp>.

"www.iCIMS.com—Product Strategy", product features [online], iCIMS.com [3 pages retrieved on Mar. 6, 2003]. Retrieved from the Internet.

"Workstream's Recruiting System—Benefits and Features", product features [online], Workstream, Inc., 2001-2002 [2 pages retrieved on Mar. 6, 2003]. Retrieved from the Internet: <http://www.workstreaminc.com/solutions/recruiting_systems/corporate_solutions/benefits_features.html>.

"The Right Tool for the Job—Workstream's Recruiting System", product features [online], Workstream, Inc., 2001-2002 [1 page retrieved on Mar. 6, 2003]. Retrieved from the Internet: <http://www.workstreaminc.com/solutions/recruiting_systems/corporate_solutions/communication.html>.

"Monster Momentum Tour—Applicant Pool Screen", product features [online], Monster.com, 2000 [1 page retrieved on Mar. 6, 2003]. Retrieved from the Internet: <http://www.simpatix.com/tour_applicantpool.htm>.

"Monster Momentum Tour—Actions Screen (continued)", product features [online], Monster.com, 2000 [1 page retrieved on Mar. 6, 2003]. Retrieved from the Internet: <http://www.simpatix.com/tour_actionspage2.htm>.

"Monster Momentum Tour—Evaluations Screen", product features [online], Monster.com, 2000.[1 page retrieved on Mar. 6, 2003]. Retrieved from the Internet: <http://www.simpatix.com/tour_evaluations.htm>.

"Untitled Document", product features [online], Monster.com [1 page retrieved on Mar. 6, 2003]. Retrieved from the Internet: <http://www.simpatix.com/tour_abcinfo.htm>.

"Untitled Document", product features [online], Monster.com [1 page retrieved on Mar. 6, 2003]. Retrieved from the Internet: <http://www.simpatix.com/tour_abcquestion.htm>.

"The Workforce Management Company—eLabor", product features [online], eLabor, 2002 [3 pages retrieved on Mar. 6, 2003]. Retrieved from the Internet: <http://www.skillset.com>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Products/Default.asp?Sub=1>.

"Resume Mirror: Extraction, Resume Extraction & Resume Processing", product features [online], Resume Mirror, Inc., 2001 [1 page retrieved on Mar. 6, 2003]. Retrieved from the Internet: <http://www.resumemirror.com/Technology/Default.asp?Sub=3>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Technology/Default.asp?Sub=4>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Technology/Default.asp?Sub=5>.

"Resume Mirror: Extraction, Resume Extraction & Resume Processing", product features [online], Resume Mirror, Inc., 2001 [1 page retrieved on Mar. 6, 2003]. Retrieved from the Internet: <http://www.resumemirror.com/Technology/Default.asp?Sub=6>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Vendors/Default.asp?Sub=4>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Vendors/Default.asp?Sub=5>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Corporations/Default.asp?Sub=1>.

"HiringSoftware.Com: Recruiter: Features—Recruiting Software and Applicant Tracking System", product features [online], Pharaoh Software, 2002 [2 pages retrieved on Mar. 6, 2003]. Retrieved from the Internet: <http://www.hr-soft.com/r_features.shtml>.

"HiringSoftware.Com: Recruiter: Modules: Candidates—Recruiting Software and Applicant Tracking System", product features [online], Pharaoh Software 2002 [1 page retrieved on Mar. 6, 2003]. Retrieved from the Internet: <http://www.hr-soft.com/r_m_appl.shtml>.

"ResPro Brochure: Resume Management System—Software for Staffing and Employment", product features [online], Chaparral Systems, 2003 [11 pages retrieved on Mar. 6, 2003]. Retrieved from the Internet: <http://www.chaparralsystems.com/brochure.htm>.

"ResPro: Screen Shot of Acquiring Resumes", product features [online], [1 page retrieved]. Retrieved from the Internet.

"ResPro: Screen Shot of Progress Monitor", product features [online], [1 page retrieved on Mar. 6, 2003]. Retrieved from the Internet: <http://www.chaparralsystems.com/ssfl_1.htm>.

"ResPro: Screen Shot of Route Generator", product features [online], [2 pages retrieved on Mar. 6, 2003]. Retrieved from the Internet: <http://www.chaparralsystems.com/ssfr.htm>.

"ResPro: Screen Shot of Move Generator", product features [online], [1 page retrieved on Mar. 6, 2003]. Retrieved from the Internet: <http://www.chaparralsystems.com/ssmo.htm>.

"ResPro: Screen Shot of Search", product features [online], [1 page retrieved on Mar. 6, 2003]. Retrieved from the Internet: <http://www.chaparralsystems.com/ssrs.htm>.

ResPro: Screen Shot of Descriptions, product features [online], [2 pages retrieved on Mar. 6, 2003]. Retrieved from the Internet: <http://www.chaparralsystems.com/ssudk.htm>.

"RESUMate—Products", product features [online], RESUMate, Inc. [2 pages retrieved on Mar. 7, 2003]. Retrieved from the Internet: <http://www.resumate.com/products.htm>.

"RESUMate—Database Records", product features [online], RESUMate, Inc. [1 page retrieved on Mar. 7, 2003]. Retrieved from the Internet: <file://C:\DOCUME~1\samantha\LOCALS~1\Temp\FKV4180M.htm>.

"RESUMate—Moving the Resume into RESUMate is Easy", product features [online], RESUMate, Inc. [1 page retrieved on Mar. 7, 2003]. Retrieved from the Internet: <http://www.resumate.com/tour/moving_the_resume_into_resumate.htm>.

"RESUMate—Here's Complete Database Record", product features [online], RESUMate, Inc.[1 page retrieved on Mar. 7, 2003]. Retrieved from the Internet: <http://www.resumate.com/tour/the_complete_database_record.htm>.

"RESUMate—Searching is Easy", product features [online], RESUMate, Inc. [1 page retrieved on Mar. 7, 2003]. Retrieved from the Internet: <http://www.resumate.com/tour/searching_is_easy.htm>.

"RecruiTEK.com—Free Job Posting", product features [online], RecruiTEK.com [2 pages retrieved on Mar. 7, 2003]. Retrieved from the Internet: <http://www.recruitek.com/Home.aspx?mid=213&tabindex=0&tabid=1&subtabindex=1&subtabid=15>.

RecruiTEK.com—Web-based Applicant Tracking and Resume Processing System, product features [online], RecruiTEK.com [1 page retrieved]. Retrieved from the Internet.

"HireWorks", product features [online], Hireworks.com [3 pages retrieved on Mar. 7, 2003]. Retrieved from the Internet: <http:/www.hireworks.com/ProductsServices.asp>.

"About the Cyberspace Mining Company", fact sheet [online], CyberSpace Mining Company, 2001-2002 [2 pages retrieved on Mar. 7, 2003]. Retrieved from the Internet: <http://www.cyberspacemining.com/factsheet.php>.

"Products—Speed to Hire", product features [online], CyberSpace Mining Company, 2001-2002 [1 page retrieved on Mar. 7, 2003]. Retrieved from the Internet: <http://www.cyberspacemining.com/products.php>.

"Find the Best Resumes First—Windgate", product features [online], Windgate Corporation, 2001 [2 pages retrieved on Mar. 7, 2003]. Retrieved from the Internet: <http://www.windgatesoftware.com/article02.htm>.

"How Look™ Works for You—Windgate", product features [online], Windgate Corporation, 2001 [1 page retrieved]. Retrieved from the Internet.

"Windgate Look™ Resume Management—Windgate", product features [online], Windgate Corporation 2001 [1 page retrieved]. Retrieved from the Internet.

"Windgate Look—[Client NW Trek]", demo program [online], Windgate Corporation [1 page retrieved]. Retrieved from the Internet.

"Windgate Look™ Keywords—Windgate", product features [online], Windgate Corporation 2001 [1 page retrieved]. Retrieved from the Internet.

"Windgate Look™ Import Resumes—Windgate", product features [online], Windgate Corporation 2001 [1 page retrieved]. Retrieved from the Internet.

"Windgate Look™ Search—Windgate", product features [online], Windgate Corporation 2001 [1 page retrieved]. Retrieved from the Internet.

"Nerds Software—Applicant Tracking Software/Recruiting Software", product features [online], NerdsSoftware.com [1 page retrieved on Mar. 7, 2003]. Retrieved from the Internet: <http://www.nerdssoftware.com/inspector_30.html>.

"Nerds Software—Applicant Tracking Software/Recruiting Software", product features [online], NerdsSoftware.com [1 page retrieved]. Retrieved from the Internet.

"Nerds Software—Searching for Applicants", product features [online], NerdsSoftware.com [1 page retrieved on Mar. 7, 2003]. Retrieved from the Internet: <http://www.nerdssoftware.com/desk_help/ri305d4g.htm>.

"Nerds Software—Searching for Applicants—Skills Tab", product features [online], NerdsSoftware.com [1 page retrieved on Mar. 7, 2003]. Retrieved from the Internet: <http://www.nerdssoftware.com/desk_help/ri305d68.htm>.

"Nerds Software—Skill Set Options", product features [online], NerdsSoftware.com [1 page retrieved on Mar. 7, 2003]. Retrieved from the Internet: <http://www.nerdssoftware.com/desk_help/ri300k4w.htm>.

"Nerds Software—Job Classification Options", product features [online], NerdsSoftware.com [1 page retrieved on Mar. 7, 2003]. Retrieved from the Internet: <http://www.nerdssoftware.com/desk_help/ri300k6o.htm>.

"Nerds Software—Adding Applicant Records", product features [online], NerdsSoftware.com [2 pages retrieved on Mar. 7, 2003]. Retrieved from the Internet: <http://www.nerdssoftware.com/desk_help/ri305a0g.htm>.

"Nerds Software—List Screens", product features [online], NerdsSoftware.com [1 page retrieved on Mar. 7, 2003]. Retrieved from the Internet: <http://www.nerdssoftware.com/desk_help/ri305g34.htm>.

"Employment Software: Web Based Software for Employment Agencies", product features [online], EmploymentSoftware.com [1 page retrieved on Mar. 7, 2003]. Retrieved from the Internet: <http://www.employmentsoftware.com>.

"Agent Function Menu—Search These Collected Resumes", product features [online], EmploymentSoftware.com [1 pages retrieved on Mar. 7, 2003]. Retrieved from the Internet: <http.//www.employmentsoftware.com/agent/agentmenu.asp>.

"Agent Function Menu—Candidates Menu", product features [online], EmploymentSoftware.com [1 page retrieved on Mar. 7, 2003]. Retrieved from the Internet: <http.//www.employmentsoftware.com/agent/agentmenu.asp>.

"Employment Software Demo", product features [online], EmploymentSoftware.com [1 page retrieved]. Retrieved from the Internet.

"Nufront Products Page", product features [online], Nufront.com [2 pages retrieved on Mar. 7, 2003]. Retrieved from the Internet: <http://www.nufront.com/products.htm.

"Nufront—Dedicated to your Success", product features [online], Nufront Inc., 2000 [1 page retrieved on Mar. 7, 2003]. Retrieved from the Internet: <http://www.nufront.com/techinfo.htm>.

"Overview—2Interview Careers Portal!", product features [online], 2Interview.com [6 pages retrieved on Mar. 7, 2003]. Retrieved from the Internet: <http://www.2interview.com/systemoverview.html>.

"Welcome to 2Interview!", product features [online], 2Interview.com [2 pages retrieved on Mar. 7, 2003]. Retrieved from the Internet: <http://www.2interview.com/oview.html>.

"Screens—Why Use Careers Portal?", product features [online], 2Interview.com [1 page retrieved on Mar. 7, 2003]. Retrieved from the Internet: <http://www.2interview.com/screen.html>.

"2Interview", product features [online], 2Interview.com [2 pages retrieved on Mar. 7, 2003]. Retrieved from the Internet: <http://www.2interview.com/install.html>.

"Parodia :: ASP Internet Recruitment System :: Job Board Software :: Third Party (Agency) Section", product features [online], Cactusoft Ltd., 1999-2003 [2 pages retrieved on Mar. 7, 2003]. Retrieved from the Internet: <http://www.parodia.net/jb/thirdparty.asp>.

"Parodia :: ASP Internet Recruitment System :: Job Board Software :: Back End", product features [online], Cactusoft Ltd., 1999-2003 [3 pages retrieved on Mar. 7, 2003]. Retrieved from the Internet: <http://www.parodia.net/jb/backend.asp>.

"Parodia :: ASP Internet Recruitment System :: Job Board Software :: Overview", product features [online], Cactusoft Ltd. [1 page retrieved on Mar. 7, 2003]. Retrieved from the Internet.

"Parodia :: Recruitment Applications :: Custom Databases :: Ecommerce", product features [online], Cactusoft Ltd., 1999-2003 [1 page retrieved]. Retrieved from the Internet.

"WorkforceERP Product Suite by Recruiting Solutions", product features [online], Recruiting Solutions International, Inc., 2001-2003 [2 pages retrieved on Mar. 7, 2003]. Retrieved from the Internet: <http://www.recruitingsolutions.net/products/recruitingcenter.htm>.

"Recruitsoft | Solutions & Services | Recruitsoft Solutions | The Recruiter WebTop Suite", product features [online], Recruitsoft Inc., 2002 [1 page retrieved on Mar. 7, 2003]. Retrieved from the Internet: <http://www.recruitsoft.com/en/solutions/solution/webtop.html>.

"Recruitsoft | Solutions & Services | Recruitsoft Solutions | ACE Enterprise Staffing", product features [online], Recruitsoft Inc., 2002 [2 pages retrieved on Mar. 7, 2003]. Retrieved from the Internet: <http://www.recruitsoft.com/en/solutions/solution/ace.html>.

"Recruitsoft | Solutions & Services | Recruitsoft Solutions | Staffing Supply Chain", product features [online], Recruitsoft Inc., 2002 [1 page retrieved on Mar. 7, 2003]. Retrieved from the Internet: <http://www.recruitsoft.com/en/solutions/solution/supply.html>.

"Recruitsoft | Solutions & Services | Recruitsoft Solutions | Integrating with ERPs", product features [online], Recruitsoft Inc., 2002 [1 page retrieved on Mar. 7, 2003]. Retrieved from the Internet: <http://www.recruitsoft.com/en/solutions/solution/erps.html>.

"General Features—TRMRecruiting Solutions", product features [online], TRMRecruiting.com, 2003 [3 pages retrieved on Mar. 7, 2003]. Retrieved from the Internet: <http://www.trmrecruiting.com/scripts/general_features.asp>.

"TRM Recruiting Solutions—OnLine Applications", product features [online], TRMRecruiting.com [2 pages retrieved on Mar. 7, 2003]. Retrieved from the Internet: <http://www.trmrecruiting.com/scripts/candidateapplication.asp?NewPageNum=1>.

"TRM Recruiting Solutions—Multiple Search Capabilities—Detailed Search", product features [online], TRMRecruiting.com [1 page retrieved on Mar. 7, 2003]. Retrieved from the Internet: <http://www.trmrecruiting.com/scripts/detailedsearch.asp?NewPageNum=3>.

"TRM Recruiting Solutions—Multiple Search Capabilities—Find a Candidate", product features [online], TRMRecruiting.com [1 page retrieved on Mar. 7, 2003]. Retrieved from the Internet: <http://www.trmrecruiting.com/scripts/findacandidate.asp?NewPageNum=4>.

"Products—Recruiter Edition—TRMRecruiting Solutions", product features [online], TRMRecruiting.com, 2003 [2 pages retrieved on Mar. 7, 2003]. Retrieved from the Internet: <http://www.trmrecruiting.com/scripts/recruiter_edition.asp>.

"PowerPlace—Products—PowerPlace Software", product features [online], PowerPlace Software, Inc., 2003 [4 pages retrieved on Mar. 7, 2003]. Retrieved from the Internet: <http://64.225.39.2/powerplace/Products.htm>.

"PowerPlace—Technology—PowerPlace Software", product features [online], PowerPlace Software, Inc., 2003 [3 pages retrieved on Mar. 7, 2003]. Retrieved from the Internet: <http://64.225.39.2/powerplace/technology.htm>.

"Kenexa Recruiter: Online Recruiting System for Human Resources Professional", product features [online], Kenexa 2002 [2 pages retrieved on Mar. 7, 2003]. Retrieved from the Internet: <http://www.kenexa.com/hire/hireRec.html?Hiring%20Solutions>.

"Recruiting Software for Executive Search by Cluen—Cluen Encore", product features [online], The Cluen Corporation, 1998-2003 [1 page retrieved on Mar. 7, 2003]. Retrieved from the Internet: <http://www.cluen.com/encore/encore.asp>.

"Recruiting Software for Executive Search by Cluen—Cluen Searchlight", product features [online], The Cluen Corporation 1998-2003 [2 pages retrieved on Mar. 7, 2003]. Retrieved from the Internet: <http://www.cluen.com/encore/products/searchlight/searchlight.asp>.

"Encore's Attributes", product features [online], [1 page retrieved]. Retrieved from the Internet.

"Visual Recruitment", product features [online], Task, 1996-2001 [1 page retrieved]. Retrieved from the Internet.

"Visual Recruitment—Presentation", product features [online], Task, 1996-2001 [3 pages retrieved on Mar. 7, 2003]. Retrieved from the Internet: <http://www.visualrecruitment.com/vrlpresentationuk.htm>.

"Visual Recruitment—Presentation—Internet Service", product features [online], Task, 1996-2001 [1 page retrieved]. Retrieved from the Internet.

"Visual Recruitment—Presentation—Internet Service—Internet Service UK Example", product features [online], [1 page retrieved]. Retrieved from the Internet.

"Gopher Recruiting Software—Products", product features [online], BlackDog [2 pages retrieved on Mar. 7, 2003]. Retrieved from the Internet: <http://www.recruiting-software.net/products.html>.

"Gopher Recruiting Software—Products Features", product features [online], BlackDog [1 page retrieved on Mar. 7, 2003]. Retrieved from the Internet: <http://www.recruiting-software.net/features.html>.

"An End-To-End Erecruitment Solution", product features [online], Netsite [2 pages retrieved on Mar. 7, 2003]. Retrieved from the Internet: <http://www.recruitactive.com/components.htm>.

"New York Times" web page [online], NYTimes.com [2 pages retrieved on Mar. 10, 2003]. Retrieved from the Internet: <http://jobs.nytimes.com/texis/rp?new=1&lookid=nyt>.

"JobCircle: New Resume Submittal", product features [online], JobCircle.com, Inc., 1998-2002 [1 page retrieved on Mar. 10, 2003]. Retrieved from the Internet: <http://www.jobcircle.com/employees/resume_home>.

"JobCircle: Resume Submittal", web page [online], JobCircle.com, Inc., 1998-2002 [2 pages retrieved on Mar. 10, 2003]. Retrieved from the Internet: <http://www.jobcircle.com/employees/submit_resume?new=1>.

"Hire.com—Solutions: Source—Sourcing Center", product features [online], Hire.com, 1996-2003 [1 page retrieved on Mar. 11, 2003]. Retrieved from the Internet: <http://www.hire.com/solutions/cand_mining.html>.

"Hire.com—Solutions Recruit", product features [online], Hire.com, 1996-2003 [1 page retrieved on Mar. 11, 2003]. Retrieved from the Internet: <http://www.hire.com/solutions/recruit>.

"Hire.com—Solutions: Recruit—Recruiting Center: Corporate", product features [online], Hire.com, 1996-2003 [1 page retrieved]. Retrieved from the Internet.

"Hire.com—Solutions: Hire—Hiring Center", product features [online], Hire.com, 1996-2003 [1 page retrieved on Mar. 11, 2003]. Retrieved from the Internet: <http://www.hire.com/solutions/hire/hiring_center.html>.

"BrassRing: HR Software for Recruiting & Workforce Management", product features [online], BrassRing.com [2 pages retrieved on Mar. 11, 2003]. Retrieved from the Internet: <http://www.brassring.com/EN/ASP/employer/Section.asp?SectionId=27&ChannelId=6&Si...>.

"Untitled", web page [online], searchease.com [2 pages retrieved]. Retrieved from the Internet: <http://www.searchease.com/CGI-bin/wc.d11?EnterSearch>.

"Administrative Features—SearchEase", product features [online], SearchEase.com Corp., 2000 [2 pages retrieved on Mar. 11, 2003]. Retrieved from the Internet: <http://www.jobboardsoftware.com/Products/features_admin.htm>.

"Employer Features—SearchEase", product features [online], SearchEase.com Corp., 2000 [1 page retrieved on Mar. 11, 2003]. Retrieved from the Internet: <http://www.jobboardsoftware.com/Products/features_employer.htm>

"Job Seeker—SearchEase", product features [online], SearchEase.com Corp., 2000 [1 page retrieved on Mar. 11, 2003-03-11]. Retrieved from the Internet: <http://www.jobboardsoftware.com/Products/features_jobseeker.htm>.

"Candidate Seeker Home Page", product features [online], CandidateSeeker.com [2 pages retrieved on Mar. 11, 2003]. Retrieved from the Internet: <http://www.candidateseeker.com/>.

"M.A.R.S.™ Premium—A Human Capital Corporation", product features [online], Humanatek, 1999-2003 [5 pages retrieved on Mar. 11, 2003]. Retrieved from the Internet: <http://www.humanatek.com/mars.html>.

"Services Offered by Recruiters—Aid to Make Your Life Manageable", product features [online], Recruiters-Aid, 1999-2001 [1 page retrieved on Mar. 11, 2003]. Retrieved from the Internet: <www.recruiters-aid.com/services.html>.

"Resource System Built by Recruiters for Recruiters", product features [online], Recruiters-Aid, 1999-2001 [2 pages retrieved on Mar. 11, 2003]. Retrieved from the Internet: <http://www.recruiters-aid.com/kit.html.

"VirtualEdge", product features [online], VirtualEdge Corp., 2002 [1 page retrieved on Mar. 11, 2003]. Retrieved from the Internet: <http://www.virtualedge.com/Index.cfm?FuseAction=DSPKeyTechnology>.

"CoreWare, Member of CoreResource and Manufacturer of CoreRecruit", product features [online], CoreWare, Inc., 2002 [2 pages retrieved on Mar. 11, 2003]. Rerieved from the Internet: <http://www.corerecruit.com/user.shtml>.

"CoreRecruit", demo program [online], CoreWare, Inc. [1 page retrieved]. Retrieved from the Internet: <http://www.corerecruit.com/images/amethystbig.jpg>.

"CoreWare, Member of CoreResource and Manufacturer of CoreRecruit", product features [online], CoreWare, Inc., 2002 [2 pages retrieved on Mar. 11, 2003]. Rerieved from the Internet: <http://www.corerecruit.com/search.shtml>.

"CoreRecruit", demo program [online], CoreWare, Inc. [1 page retrieved on Mar. 11, 2003]. Retrieved from the Internet: <http://www.corerecruit.com/images/serachscreenbig.jpg>.

"CoreWare, Member of CoreResource and Manufacturer of CoreRecruit", product features [online], CoreWare, Inc., 2002 [2 pages retrieved on Mar. 11, 2003]. Rerieved from the Internet: <http://www.corerecruit.com/candidate.shtml>.

"EZaccess 5.0", product features [online], Personic, Inc., 2000 [2 pages retrieved]. Retrieved from the Internet.

"Save Time and . . . —Here's How Eliyon Works:", product features [online], Eliyon.com [2 pages retrieved]. Retrieved from the Internet.

"PeopleCapital Staffing", product features [online], PeopleCapital, Inc., 2001-2002 [2 pages retrieved]. Retrieved from the Internet.

"TechJobsOnline.com—Employers", product features [online], TechJobsOnline, LLC, 2001 [2 pages retrieved on Mar. 14, 2003]. Retrieved from the Internet: <http://www.techjobsonline.com/Employer/Index.asp>.

"TechJobsOnline.com—Employers", product features [online], TechJobsOnline, LLC, 2001 [2 pages retrieved on Mar. 14, 2003]. Retrieved from the Internet: <http://www.techjobsonline.com/jobseeker/>.

"Fitability Systems—Features and Benefits", product features [online], Fitability Systems, LLC, 2000-2001 [1 pages retrieved on Mar. 21, 2003]. Retrieved from the Internet: <http://www.fitability.com/tour/features.asp>.

"Fitability Systems—Features and Benefits", product features [online], Fitability Systems, LLC, 2000-2001 [1 pages retrieved on Mar. 21, 2003]. Retrieved from the Internet: <http://www.fitability.com/tour/default.asp>.

"Big Tango Theory: Solutions", product features [online], bigtangotheory.com [2 pages retrieved on Mar. 21, 2003]. Retrieved from the Internet: <http://www.bigtangotheory.com/solutions.html>.

"Boston Works Media Kit: Products & Packages: Online Recruitment Options: Resume Search", product features [online], BostonWorks [2 pages retrieved on Mar. 21, 2003]. Retrieved from the Internet <http://bostonworks.boston.com/mediakit/resumesearch.shtml>.

"CareerHarmony—Employers—Solutions", product features [online], CareerHarmony, Inc., 2000 [1 page retrieved on Mar. 21, 2003]. Retrieved from the Internet: <http://www.careerharmony.com/employers/solutions.html>.

"eEmpACT: Products & Services > FrontOffice Features", product features [online], eEmpACT, 2002 [1 page retrieved on Mar. 21, 2003]. Retrieved from the Internet: <http://www.eempact.com/resumes.htm>.

"eEmpACT: Products & Services > Features", product features [online], eEmpACT, 2002 [1 page retrieved on Mar. 21, 2003]. Retrieved from the Internet: <http://www.eempact.com/applications.htm>.

"eEmpACT: Products & Services > FrontOffice Features", article [online], eEmpACT, 2002 [1 page retrieved on Mar. 21, 2003]. Retrieved from the Internet: <http://www.eempact.com/cand_emp.htm>.

"HODESiQ | Solutons | Hodes iQ Post", product features [online], Bernard Hodes Group, 2003 [2 pages retrieved on Mar. 21, 2003]. Retrieved from the Internet: <http://www.hodesiq.com/solutions/sol_hodesiq.htm>.

"Recruitment Enhancement Services", product features [online], Omnicom Group Inc. [2 pages retrieved on Mar. 21, 2003]. Retrieved from the Internet: <http://www.resjobs.com/forbes/roam.html>.

"Recruitment Enhancement Services", product features [online], Omnicom Group Inc. [1 page retrieved on Mar. 21, 2003]. Retrieved from the Internet: <http://www.resjobs.com/forbes/mining.html>.

"6FigureJobs—The Leading Site for Executive Job Seekers, Employers and Executive Recruiters", web page [online], Workstream, Inc., 2002 [4 pages retrieved on Mar. 21, 2003]. Retrieved from the Internet: <http://www.6figurejobs.com/ExecEditResume.cfm?CFID=1179069&CFTOKEN=32751082&noCache=36...>.
"RCI Employment Solutions", product features [online], Recourse Communications, Inc., 2000 [2 pages retrieved on Mar. 21, 2003]. Retrieved from the Internet:<http://www.rcies.com/employer/search/index.asp>.
"Webhire | Products", product features [online], Webhire, Inc., 2000-2003 [2 pages retrieved on Mar. 21, 2003]. Retrieved from the Internet: <http://www.webhire.com/products/corporate.asp>.
"WebRecruiter: Recruiting and Staffing Software for a Web-Enabled World", product features [online], WebRecruiter, LLC, 2002 [2 pages retrieved on Mar. 21, 2003]. Retrieved from the Internet: <http://www.webrecruiter.com/productfeatures.htm>.
"WebRecruiter™", product features [online], WebRecruiter.com [2 pages retrieved]. Retrieved from the Internet: <http://www.webrecruiter.com/pdf_brochure.pdf>.
"Search ZillionResumes", web page [online], Easytrieve.com, Inc., 2003 [1 page retrieved on Mar. 26, 2003]. Retrieved from the Internet: <http://www.zillionresumes.com/dynamic/perl/zillion.pl?action=noreg_demo&itemid=>.
"Search Help", product features [online], Easytrieve.com, Inc., 2003 [3 pages retrieved on Mar. 26, 2003]. Retrieved from the Internet: <http://www.zillionresumes.com/search_help.html>.
"About ZillionResumes", product features [online], Easytrieve.com, Inc., 2003 [2 pages retrieved on Mar. 26, 2003]. Retrieved from the Internet: <http://www.zillionresumes.com/why_zillion.html>.
"ZillionResumes Free Resume Posting", web page [online], Easytrieve.com, Inc., 2003 [1 page retrieved on Mar. 26, 2003]. Retrieved from the Internet: <http://www.zillionresumes.com/candidate_info.html>.
"SmartSearch Online—Applicant Tracking Systems Staffing Management", product features [online], Advanced Personnel Systems, Inc., 2001 [2 pages retrieved on Mar. 25, 2003]. Retrieved from the Internet: <http://www.smartsearchonline.com/home/samples.asp>.
"SmartSearch Online—Applicant Tracking Systems Staffing Management", product features.[online], Advanced Personnel Systems, Inc. [1 page retrieved on Mar. 25, 2003]. Retrieved from the Internet: <http://www.smartsearchonline.com/home/default.asp>.
"Main Sequence Technologies", product features [online], pcRecruiter.com [2 pages retrieved on Mar. 25, 2003]. Retrieved from the Internet: <http://www.perecruiter.com/products_jobBoard.htm>.
"MaxHire Applicant Tracking: The #1 Recruiting Software Solution", product features [online], MaxHire.net [2 pages retrieved on Mar. 26, 2003]. Retrieved from the Internet: <http://www.maxhire.net/information.asp>.
"AutoHire—Features", product features [online], CareerShop, Inc., 2000-2003 [2 pages retrieved on Mar. 27, 2003]. Retrieved from the Internet: <http://www.careershop.com/AutoHire_1.asp>.
"Seeker Search—JobToaster", web page [online], JobToaster.com [1 page retrieved on Mar. 25, 2003]. Retrieved from the Internet: <http://www.jobtoaster.com/SearchSeekersResponse.asp?start=0&serach=java&submit=Search&WordSearc...>.
"#1 Internet Resume Sourcing Software", product features [online], Resource Edge, Inc., 2000-2001 and XyberSleuth, Inc., 1999-2001 [2 pages retrieved on Mar. 25, 2003]. Retrieved from the Internet: <http://www.talenthook.com/>.
"Free Training and Support for a Powerful Resume Search Engine", product features [online], Resource Edge, Inc., 2000-2001 and XyberSleuth, Inc., 1999-2001 [1 page retrieved on Mar. 25, 2003]. Retrieved from the Internet: <http://www.talenthook.com/faq.html>.
"Agaveblue :: Employer Registration", product features [online], Agaveblue, Inc. 2001-2003 [1 page retrieved on Mar. 27, 2003]. Retrieved from the Internet: <http://www.agaveblue.net/employers/reg1res.asp>.
"About Us", product features [online], DataFrenzy.com [1 page retrieved on Mar. 26, 2003]. Retrieved from the Internet: <http://www.datafrenzy.com/aboutus.asp>.
"BrainHunter.com—Employers", product features [online], BrainHunter.com [1 page retrieved on Mar. 26, 2003]. Retrieved from the Internet: <http://dendrite.brainhunter.com/p196/p1sq1/bh2_cs.recruiter_home>.
"It's Time You Learn About HireHub.com", product features [online], Easytrieve.com, Inc. [2 pages retrieved]. Retrieved from the Internet: <http://www.hirehub.com/docs/hirehub-brochure.pdf>.
"Talent Match", web page [online], Dice.com [1 page retrieved on Mar. 31, 2003]. Retrieved from the Internet: <http://employer.dice.com/talentmatch/index.jsp?jan=721>.
"Dice—Find the Best Technology Professionals, Fast!", web page [online], Dice, Inc., 1991-2003 [2 pages retrieved on Mar. 31, 2003]. Retrieved from the Internet: <http://employer.dice.com/employer.ep1>.
"Appmail—An Overview", product features [online], AppMail.com [8 pages retrieved]. Retrieved from the Internet: <http://www.appmail.com/overview.pdf>.
"WebPas by VCG Inc.", product features [online], VGC, Inc., 2002 [12 pages retrieved]. Retrieved from the Internet: <http://www.vcgsoftware.com/webpas_start/wp_30_brochure.pdf>.
"Introducing StaffingSoft's Resume' Manager", product features [online], StaffingSoft.com, 2001 [2 page retrieved on Mar. 31, 2003]. Retrieved from the Internet: <http://www.staffingsoft.com/ResumeMgr.htm>.
"The Resume Manager", product features [online], StaffingSoft.com [1 page retrieved on Mar. 31, 2003]. Retrieved from the Internet: <http://www.staffingsoft.com/test_drive/resume01.htm>.
"Working with Resumes", product features [online], StaffingSoft.com [1 page retrieved on Mar. 31, 2003]. Retrieved from the Internet: <http://www.staffingsoft.com/test_drive/managing_resumes03.htm>.
"Actively Sourcing Talent", product features [online], StaffingSoft.com [1 page retrived on Mar. 31, 2003]. Retrieved from the Internet: <http://www.staffingsoft.com/test_drive/managing_resumes04.htm>.
"HireDesk: Applicant Tracking, Candidate Management & Recruiting Software Solution", product features [online], HireDesk Inc., 2002 [1 page retrieved on Mar. 31, 2003]. Retrieved from the Internet: <http://www.hiredesk.com/employers/?Side=02>.
"HireDesk: Applicant Tracking, Candidate Management & Recruiting Software Solution", product features [online], HireDesk Inc., 2002 [1 page retrieved on Mar. 31, 2003]. Retrieved from the Internet: <http://www.hiredesk.com/employers/?Side=03>.
"ResumeWare—Web-Based Applicant Tracking", product features [online], ResumeWare.com [1 page retrieved on Mar. 31, 2003]. Retrieved from the Internet: <http://www.resumeware.com/main.html>.
"OpenHire—An Outtask Business Solution", product features [online], Outtask, Inc., 2002 [4 pages retrieved]. Retrieved from the Internet: <http://www.outtask.com/pdfs/openhire_brochure.pdf>.
"Find Best Candidates with Employ!", product features [online], Deploy Solutions, Inc., 2002 [1 page retrieved on Mar. 6, 2003]. Retrieved from the Internet: <http://www.deploy.com/products/findbest.cfm>.
"Deploy's Hirequest", product features [online], Deploy Solutions, Inc., 2002 [1 page retrieved on Mar. 6, 2003]. Retrieved from the Internet: <http://www.deploy.com/products/hirequest.cfm>.
"Deploy's Resume Processing", product features [online], Deploy Solutions, Inc., 2002 [1 page retrieved on Mar. 6, 2003]. Retrieved from the Internet: <http://www.deploy.com/services/resume.cfm>.
"eRecruiter", product features [online], eRecruiter, LLC, 2001 [1 page retrieved on Mar. 4, 2003]. Retrieved from the Internet: <http://www.erecruiter.com/demos.php?num=9>.
"eRecruiter", product features [online], eRecruiter, LLC, 2001 [1 page retrieved on Mar. 4, 2003]. Retrieved from the Internet: <http://www.erecruiter.com/demos.php?num=5>.
"NetworkersPro—Revolutionary New Internet Based Staffing Software with Resume Tracking, Resume Databa . . . ", product features [online], Networkerspro.com, Inc., 2000-2002 [1 page retrieved DATE]. Retrieved from the Internet: <http://www.networkerspro.com/>.

"NetworkersPro—Applicants Screen Shot", demo program [online], Networkerspro.com, Inc., 2000-2002 [1 page retrieved]. Retrieved from the Internet: <http://www.networkerspro.com/ssapplicant.html>.

"NetworkersPro—Applicant Search Screen Shot", demo program [online], Networkerspro.com, Inc., 2000-2002 [1 page retrieved]. Retrieved from the Internet: <http://www.networkerspro.com/ss-search.html>.

"NetworkersPro—Applicant Quick Entry Screen Shot", demo program [online], Networkerspro.com, Inc., 2000-2002 [1 page retrieved]. Retrieved from the Internet: <http://www.networkerspro.com/ssgentry.html>.

"Resume Grabber for Internet Recruiting, Dice.com, Monster.com, Recruiter Resources", product features [online], eGrabber Inc., 1999-2003 [5 pages retrieved on May 8, 2003]. Retrieved from the Internet: <http://www.deals4recruiters.com/resumegrabber/index4.html>.

"JobWarehouse.com: Visit Hiring Companies", web page [online], JobWarehouse.com, Inc., 1997-2003 [1 page retrieved on May 7, 2003]. Retrieved from the Internet: <http://www.jobwareehouse.com/jwc/companies.cfm?cmd=Detail&company_id=1103>.

"Resume Wahoo", product features [online], ResumeWahoo.com, 2000-2003 [1 page retrieved on May 7, 2003]. Retrieved from the Internet: <http://www.resumewahoo.com/>.

"Job.com—Jobseeker Center", web page [online], Job.com, 2002 [2 pages retrieved on May 5, 2003]. Retrieved from the Internet: <http://www.job.com/jobseekers/index.cfm?tid=signup.cfm>.

"Job.com—Untitled", product features [online], Job.com [3 pages retrieved]. Retrieved from the Internet.

"Resume-Net", product features [online], HCM Media, Inc., 1998-2003 [1 page retrieved on May 2, 2003]. Retrieved from the Internet: <http://www.resume-net.com/>.

"Resume-Net :: Demo Search", demo program [online], HCM Media, Inc., 1998-2003 [1 page retrieved]. Retrieved from the Internet.

"Resume-Net :: New Job Seeker Profile", demo program [online], HCM Media, Inc., 1998-2003 [1 page retrieved]. Retrieved from the Internet.

"Netshare—Your Center for Executive Jobs", product features [online], Netshare.com, 2003 [1 page retrieved on May 2, 2003]. Retrieved from the Internet: <http://www.netshare.com/recruiters_and_companies/search_database.asp>.

"Executive Recruiters, Executive Search Firms and Companies—Post Executive Jobs Now—NETSHARE.com", product features [online], Netshare.com 2003 [2 pages retrieved on May 2, 2003]. Retrieved from the Internet: <http://www.netshare.com/recruiters_and_companies/index.asp>.

"Wanted Technologies—Solutions", product features [online], Wanted Technologies, Inc., 2003 [1 page retrieved on May 7, 2003]. Retrieved from the Internet: <http://www.wantedtech.com/solutions.html>.

"Wanted Technologies—Solutions, RAM", product features [online], Wanted Technologies, Inc. 2003 [2 pages retrieved on May 7, 2003]. Retrieved from the Internet: <http://www.wantedtech.com/ram.html>.

"ProHire | The Leader in Online Job Searching and Recruiting Solutions has Jobs and Employment for Profes", product features [online], Creative Systems Solutions 2001 [1 page retrieved]. Retrieved from the Internet.

"T&E Solutions, Inc.: Human Resources Suite—Applicant Tracking", product features [online], T&E Solutions, Inc., 2002 [1 page retrieved]. Retrieved from the Internet.

"T&E Solutions, Inc.: Doctor's Office Management Systems (DOMS)", demo program [online], T&E Solutions, Inc., 2002 [2 pages retrieved]. Retrieved from the Internet.

"Applicant Tracking Systems 2003 Industry Analysis & Buyer's Guide", industry analysis [online], Electronic Recruiting Exchange, Inc., 2003 [158 pages retrieved]. Retrieved from the Internet: <http://www.erexchange.com/ats2003/premium>.

"CollegeGrad.com Resumes", web page [online], CollegeGrad.com [3 pages retrieved on May 29, 2003]. Retrieved from the Internet: <http://www.collegegrad.jobcontrolcenter.com/apply/advertise.cfm>.

"Applicant Tracking Software", product features [online], ApplicantSmartware.com [2 pages retrieved on Jun. 4, 2003]. Retrieved from the Internet: <http://www.applicantsmartware.com/>.

"Product Preview Screens—AgencySmartware—Candidate Form", web page [online], ApplicantSmartware.com [1 page retrieved]. Retrived from the Internet: <http://www.applicantsmartware.com/images/image7.htm>.

"Product Preview Screens—ApplicantSmartware—Search Form", web page [online], ApplicantSmartware.com [1 page retrieved]. Retrived from the Internet: <http://www.applicantsmartware.com/images/image15.htm>.

"Products", product features [online], ApplicantSmartware.com [1 page retrieved on Jun. 4, 2003]. Retrieved from the Internet: <http://www.applicantsmartware.com/products.htm>.

"CareerCast, Inc.—Resume Database", product features [online], CareerCast, Inc., 2003 [1 page retrieved on Jun. 4, 2003]. Retrieved from the Internet: <http://www.careercast.com/products.php?page=products&content=5>.

"CareerCast, Inc.—Tracking & Reporting" product features [online], CareerCast, Inc., 2003 [1 page retrieved on Jun. 4, 2003]. Retrieved from the Internet: <http://www.careercast.com/products.php?page=products&content=6>.

"CareerCast, Inc.—Job Database" product features [online], CareerCast, Inc., 2003 [1 page retrieved on Jun. 4, 2003]. Retrieved from the Internet: <http://www.careercast.com/products.php?page=products&content=4>.

"CareerCast, Inc.—Job Seeker Tools" product features [online], CareerCast, Inc., 2003 [1 page retrieved on Jun. 4, 2003]. Retrieved from the Internet: <http://www.careercast.com/products.php?page=products&content=3>.

"CareerCast, Inc.—Enterprise Admin" product features [online], CareerCast, Inc. 2003 [1 page retrieved on Jun. 4, 2003]. Retrieved from the Internet: <http://www.careercast.com/products.php?page=products&content=8>.

"Features—Pursuant Technologies", product features [online], Pursuant Technologies, 2001 [1 page retrieved on Jun. 4, 2003]. Retrieved from the Internet: <http://www.pursuanttech.com/features.cfm>.

"The Jobs—Job Search Site Employment Opportunities & Job Listing Online!", web page [online], Post-a-Job.com [1 page retrieved on Jun. 6, 2003]. Retrieved from the Internet: <http://www.post-a-job.com/cgi-bin/c2r48/atlant/atl.cgi?ct=a8&md>.

"The Jobs—Job Search Site Employment Opportunities & Job Listing Online!", web page [online], Post-a-Job.com [2 pages retrieved on Jun. 6, 2003]. Retrieved from the Internet: <http://www.post-a-job.com/cgi-bin/c2r48/atlant/atl.cgi?ct=a8&md=addform>.

"Software and Technology Sales Jobs—SalesRecruits.com", web page [online], SalesRecruits.com [1 page retrieved on Jun. 6, 2003]. Retrieved from the Internet: <http://www.salesrecruits.com/searchResumes.cfm>.

"PerfectSoftware—HR Software—Human Resource Software for Applicant Tracking, and Benefit Manage . . . ", product features [online], PerfectSoftware.com [1 page retrieved on Jun. 9, 2003]. Retrieved from the Internet: <http://www.perfectsoftware.com/pshtml/atm.html>.

"Home of Perfect Software, Inc.~hr Applicant", web page [online], Perfect Software, Inc., 1989-2001 [3 pages retrieved on Jun. 9. 2003]. Retrieved from the Internet: <http://www.perfectsoftware.com/pshtml/atm_screenshots.html>.

"EZ Recruit—Our Products", product features [online], EZRecruit.com [2 pages retrieved on Jun. 9, 2003]. Retrieved from the Internet: <http://www.ezrecruit.com/products.asp>.

"Overview of EZRecruit and EZVendor", product features [online], EZRecruit.com [1 page retrieved]. Retrieved from the Internet.

"WetFeet > Recruitment Technologies > Features and Benefits", product features [online], WetFeet, Inc., 2003 [2 pages retrieved on Jun. 9, 2003]. Retrieved from the Internet: <http://www.wetfeet.com/about/what/wfrecruiter/features.asp>.

"WetFeet Recruiter Tour—How Does WetFeet Recruiter Help?", product features [online], WetFeet.com [1 page retrieved on Jun. 9, 2003]. Retrieved from the Internet: <http://www.wetfeet.com/about/recruiterdemo/slide1.html>.

"WetFeet Recruiter Tour—What Does WetFeet Recruiter Do?", product features [online], WetFeet.com [1 page retrieved on Jun. 9, 2003]. Retrieved from the Internet: <http://www.wetfeet.com/about/recruiterdemo/slide2.html>.

"WetFeet Recruiter Tour—Focus on Top Candidate Immediately", product features [online], WetFeet.com [1 page retrieved on Jun. 9, 2003]. Retrieved from the Internet: <http://www.wetfeet.com/about/recruiterdemo/slide5.html>.

"WetFeet Recruiter Tour—Manage Recruits Through the Evaluation Process", product features [online], WetFeet.com [1 page retrieved on Jun. 9, 2003]. Retrieved from the Internet: <http://www.wetfeet.com/about/recruiterdemo/slide6.html>.

"WetFeet Recruiter Tour—Centralize Candidate Information in Your Private Talent Database", product features [online], WetFeet.com [1 page retrieved on Jun. 9, 2003]. Retrieved from the Internet: <http://www.wetfeet.com/about/recruiterdemo/slide7.html>.

"HotResumes.com | 'Your Source for Thousands of Resumes!'", web page [online], HotResumes.com, 2002 [3 pages retrieved on May 21, 2003]. Retrieved from the Internet: <http://www.hotresumes.com/index.cfm?t=signup.cfm>.

"HotResumes.com | 'Your Source for Thousands of Resumes!'", web page [online], HotResumes.com [1 page retrieved on May 21, 2003]. Retrieved from the Internet: <http://www.hotresumes.com/index.cfm?t=search&s=2&start=1&ed=5&relo=0&H1B=0&IID=-1&view=1&...>.

"Abra Recruiting Solution™", product features [online], Best Software, Inc., 2002 [2 pages retrieved]. Retrieved from the Internet.

"Bullhorn Staffing: #1 in Web-Native STAFFING Software:", product features [online], Bullhorn, Inc., 1999-2003 [1 page retrieved on May 22, 2003]. Retrieved from the Internet: <http://www.bullhhorn.com/Home.6.0/BHContent_Solutions_PremierTools_Resume.htm>.

"Bullhorn Staffing: #1 in Customizable STAFFING Software", demo program [online], Bullhorn.com [2 pages retrieved]. Retrieved from the Internet.

"Resume Tracker Quick Tour", product features [online], askSam Systems [5 pages retrieved on Jun. 4, 2003]. Retrieved from the Internet: <http://www.asksam.com/rtstour.asp>.

"ComputerJobs.com—What is a Skills Summary?", web page [online], ComputerJobs.com [1 page retrieved]. Retrieved from the Internet.

"Profile-Based Recruiting" by Alice Snell, article [online], Electronic Recruiting Exchange, Feb. 11, 2003 [3 pages retrieved on Jun. 9, 2003]. Retrieved from the Internet: <http://www.erexchange.com/articles/db/05E54AB231E343C0BC35492E8173EC62.asp>.

"Axiom JobQ", product features [online], Axiom Software, 2002, [5 pages retrieved on Aug. 1, 2003]. Retrieved from the Internet: <http://www.axiomjobq.com>.

"TrueCareers : Employers : Our Services", web page [online], TrueCareers Inc., 2001-2003, [3 pages retrieved on Mar. 14, 2003]. Retrieved from the Internet: <http://www.truecareers.com/EmployerX/OurServices.asp>.

"About AIRS—AIRS", web page [online], AIRS, 2003 [1 page retrieved on Oct. 21, 2003]. Retrieved from the Internet: <http://www.airsdirectory.com/aboutairs/press/press_release/oxygen_2_release.html>.

"Product Information", web page [online], AIRS, 2003 [3 pages retrieved on Oct. 21, 2003]. Retrieved from the Internet: <http://www.airsoxygen.com/spartner/product.guid?_page=productpromo2>.

Analysts International Website Pages [online], Analysts International, 2003 [2 pages retrieved on Oct. 29, 2003]. Retrieved from the Internet: <http://www.analysts.com/>.

"IT Supplemental Resources—Highly-Qualified People in the Right Place, at the Right Time", product features [online], Analysts International Corporation, 2001 [2 pages retrieved]. Retrieved from the Internet.

Beeline Website pages [online], Beeline.com, Inc., 1999-2003 [12 pages retrieved on Oct. 29, 2003]. Retrieved from the Internet: <http://www.beeline.com/>.

Bullhorn Website Pages [online], Bullhorn, Inc., 1999-2003 [32 pages retrieved on Oct. 29, 2003]. Retrieved from the Internet: <http://www.bullhorn.com/>.

Burning Glass Website Pages [online], Burning Glass Technology, 2003 [32 page retrieved on Nov. 26, 2003]. Retrieved from the Internet: <http://www.burningglass.com/>.

Elance Website Pages [online], Elance, Inc., 2000-2003 [26 page retrieved on Oct. 29, 2003]. Retrieved from the Internet: <http://www.elance.com/>.

Chimes Website Pages [online], Chimes, Inc. 2003 [16 pages retrieved on Oct. 29, 2003]. Retrieved from the Internet: <http://www.chimesnet.com/public/aboutus/execsummary.cfm>.

Comensura Website Pages [online], Comensura, 2001 [4 pages retrieved on Oct. 29, 2003]. Retrieved from the Internet: <http://www.comensura.com/>.

"What we do", web page [online], Corporate Services Group [1 page retrieved on Oct. 29, 2003]. Retrieved from the Internet: <http://www.csg-group.com/business/content/content_we.htm>.

Clear Technology Website Pages [online], Clear Technology, Inc. [13 pages retrieved on Oct. 29, 2003]. Retrieved from the Internet: <http://www.clear-technology.com/>.

Covendis Technologies Website Pages [online], Covendis Technologies, 2001 [13 page retrieved on Oct. 29, 2003]. Retrieved from the Internet: <http://www.covendis.com/>.

DataFrenzy Website Pages [online], Data Frenzy!, 2003 [8 page retrieved on Dec. 10, 2003]. Retrieved from the Internet: <http://www.datafrenzy.com/>.

DCR Website Pages [online], DCR, 2001 [9 pages retrieved on Oct. 30, 2003]. Retrieved from the Internet: <http://www.dcr-inc.com/>.

Econometrix Website Pages [online], Econometrix [8 pages retrieved on Oct. 30, 2003]. Retrieved from the Internet: <http://www.econometrix.com/>.

CREATIVEmoonlighter Website Page [online], Emoonlighter.com [4 pages retrieved on Dec. 12, 2003]. Retrieved from the Internet: <http://www.creativemoonlighter.com/>.

"Tech 50 winners spoiling for fight", web page [online], PG Publishing Co., Inc. 1997-2003 [2 pages retrieved on Dec. 12, 2003]. Retrieved from the Internet: <http://www.post-gazette.com/pg/03290/231803.stm>.

"Small Companies, Big Returns", web page [online], Ziff Davis Media, Inc. 2001-2003 [4 pages retrieved on Dec. 12, 2003]. Retrieved from the Internet: <http://www.baselinemag.com/article2/0,3959,1325756,00.asp>.

"Boosted by Guru buy, Emoonlighter reports 2Q gains—Aug. 5, 2003—Pittsburgh Business . . . ", article [online], American City Business Journals, Inc. 2003 [1 page retrieved on Dec. 12, 2003]. Retrieved from the Internet: <http://pittsburgh.bizjournals.com/Pittsburgh/stories/2003/08/04/daily21.html?t=printable>.

"Customers aren't biting or fighting at Robot Club & Grill—Apr. 28, 2003—Pittsburgh Busin . . . ", article [online], American City Business Journals, Inc. 2003 [2 pages retrieved on Dec. 12, 2003]. Retrieved from the Internet: <http://pittsburgh.bizjotimals.com/pittsburgh/stories/2003/04/28/focus4.html?t=printable>.

"Emoonlighter's controlled growth helps it succeed in tough economy—Feb. 17, 2003—Pitts . . . ", article [online], American City Business Journals, Inc. 2003 [3 pages retrieved on Dec. 12, 2003]. Retrieved from the Internet: <http://pittsburgh.bizjournals.com/pittsburgh/stories/2003/02/17/story7.html?t=printable>.

"Tech Council announces Tech 50 winners—Sep. 27, 2002—Pittsburgh Business Times", article [online], American City Business Journals, Inc. 2002 [1 page retrieved on Dec. 12, 2003]. Retrieved from the Internet: <http://pittsburgh.bizjournals.com/pittsburgh/stories/2003/09/23/daily48.html?t=printable>.

"CourierPostOnline—South Jersey Careers", web page [online], Courier-Post 2003 [2 pages retrieved on Dec. 12, 2003]. Retrieved from the Internet: <http://www.southjerseycareers.com/sjc051302a.html>.

"Major Business News—The Wall Street Journal Sunday", web page [online], Dow Jones & Company, Inc. 2002 [3 pages retrieved on Dec. 12, 2003]. Retrieved from the Internet: <http://www.creativemoonlighter.com/press_wsj_april.html>.

"Five fun ways to make quick cash—Mar. 13, 2002", article [online], CNN/Money [3 pages retrieved on Dec. 12, 2003]. Retrieved from the Internet: <http://cnnmoney.printthis.clickability.com/pt/cpt?action=cpt&title=Five+fun+ways+to+m...>.

"Moonlighting is popular, whether you need the extra money or not Dec. 23, 2001", web page [online], The Florida Times-Union [3 pages retrieved on Dec. 12, 2003]. Retrieved from the Internet: <http://www.jacksonville.com/tu-online/stories/122301/bus_8149409.html>.

"The interbiznet Bugler—Daily News for the Recruiting Professional", web page [online], IBN: interbiznet Inc. 1999-2000[2 pages retrieved on Dec. 12, 2003]. Retrieved from the Internet: <http://www.interbiznet.com/bugler/bugler_00.09.27.html>.

Emoonlighter Website Pages [online], Emoonlighter [15 pages retrieved on Dec. 12, 2003]. Retrieved from the Internet: <http://emoonlighter.com/>.

"Amarillo Business Journal: Online job hunting works for businesses Oct. 2, 2000", web page [online], Amarillo Globe-News 2000 [2 pages retrieved on Dec. 12, 2003]. Retrieved from the Internet: <http://www.amarillonet.com/stories/100200/bus_100200-27.shtml>.

"Help Center—Employer", web page [online], [2 pages retrieved on Dec. 12, 2003]. Retrieved from the Internet: <http://www.emoonlighter.com/help_center/emp_general_info.cfm>.

EmployOn Website Pages [online], EmployOn 2003 [14 pages retrieved on Nov. 26, 2003]. Retrieved from the Internet: <http://www.employon.com/>.

Enthusian Website Pages [online], Enthusian Corp. 2000-2001 [6 pages retrieved on Oct. 31, 2003]. Retrieved from the Internet: <http://www.enthusian.com/>.

eWork Website Pages [online], eWork Exchange, Inc. 2003 [25 pages retrieved on Oct. 31, 2003]. Retrieved from the Internet: <http://www.ework.com/>.

ExecuNet Website Pages [online], ExecuNet 2003 [11 page retrieved on Oct. 10, 2003]. Retrieved from the Internet: <http://www.execunet.com/>.

Fieldglass Website Pages [online], Fieldglass, Inc. 2001-2002 [32 pages retrieved on Oct. 31, 2003]. Retrieved from the Internet: <http://www.fieldglass.com/>.

"FillYourJobs.com—Bridging the Gap Between Client and Vendor", product features [online], FillYourJobs.com [6 pages]. Retrieved from the Internet.

FillYourJobs Website Pages [online], FillYourJobs.com 2001-2002 [6 pages retrieved on Oct. 31, 2003]. Retrieved from the Internet: <http://www.fillyourjobs.com/>.

GlobalServe Website Pages [online], GlobalServe.com [3 pages retrieved on Nov. 19, 2003]. Retrieved from the Internet: <http://www.global-serve.com/>.

Gopher Recruiting Website Pages [online], BlackDog Inc. [6 pages retrieved on Oct. 10, 2003]. Retrieved from the Internet: <http://go4recruitingsoftware.com/>.

Resume Software Website Pages [online], gopher-software.com [12 pages retrieved on Oct. 10, 2003]. Retrieved from the Internet: <http://www.resume-software.com/>.

Hy-Phen Website Pages [online], hy-phen.com 2002 [8 pages retrieved on Nov. 19, 2003]. Retrieved from the Internet: <http://www.hy-phen.com/>.

Workstream Website Pages [online], Workstream Inc. 2003 [7 pages retrieved on Nov. 19, 2003]. Retrieved from the Internet: <http://www.workstreaminc.com/>.

iCIMS Website Pages [online], iCIMS 1999-2003 [4 pages retrieved on Nov. 19, 2003]. Retrieved from the Internet: <http://www.icims.com/>.

Infinity Consulting Group Website Pages [online], Infinity Consulting Group 1998-2003 [16 pages retrieved on Nov. 19, 2003]. Retrieved from the Internet: <http://www.infinitygroup.com/>.

Interactive Business Systems Website Pages [online], Interactive Business Systems, Inc. 2003 [21 pages retrieved on Dec. 1, 2003]. Retrieved from the Internet: <http://www.ibs.com/>.

"The Good, The Bad and The Ugly", article [online], NewsForRecruiters.com 2002 [1 page retrieved on Dec. 1, 2003]. Retrieved from the Internet: <http://www.newsforrecruiters.com/issue/index.cfm?t=article&a=13&ii=7>.

"News for Recruiters", article [online], NewsForRecruiters.com 2002 [2 pages retrieved on Dec. 1, 2003]. Retrieved from the Internet: <http://www.newsforrecruiters.com/issue/index.cfm?t=article&a=6&ii=2>.

IQ Navigator Website Pages [online], IQ Navigator [32 pages retrieved on Dec. 1, 2003]. Retrieved from the Internet: <http://www.iqnavigator.com/>.

iServiceX Website Pages [online], iServiceX, Inc. 2003 [44 pages retrieved on Dec. 1, 2003]. Retrieved from the Internet: <http://www.iservicex.com/>.

The Judge Group Website Pages [online], The Judge Group [2 pages retrieved on Dec. 1, 2003]. Retrieved from the Internet: <http://www.judge.com/>.

JudgeTech Contract Staffing Website Pages [online], Judge Technical Services [2 pages retrieved on Dec. 1, 2003]. Retrieved from the Internet: <http://www.judgejts.com/>.

LiquidMedium Website Pages [online], LiquidMedium [24 pages retrieved on Dec. 1, 2003]. Retrieved from the Internet: <http://www.liquidmedium.com/>.

MaxHire Website Pages [online], MaxHire, 2002 [5 pages retrieved on Oct. 10, 2003]. Retrieved from the Internet: <http://www.maxhire.net/>.

Mohomine Website Pages [online], Mohomine Inc. 2003 [11 pages retrieved on Nov. 26, 2003]. Retrieved from the Internet: <http://www.mohomine.com/>.

"Mohomine—Corporate Fact Sheet", product features [online], Mohomine, Inc. 2003 [1 page]. Retrieved from the Internet.

"Mohomine—mohoResume Extractor v4.6", product features [online], Mohomine, Inc. 2003 [2 pages]. Retrieved from the Internet.

"Mohomine—mohoResume Extractor v4.6 for Oracle iRecruitment", product features [online], Mohomine, Inc. 2003 [2 pages]. Retrieved from the Internet.

"Mohomine—mohoClassifier v2.3", product features [online], Mohomine, Inc. 2003 [2 pages]. Retrieved from the Internet.

"Mohomine—mohoClassifier for National Security Organizations", product features [online], Mohomine, Inc. 2003 [1 page]. Retrieved from the Internet.

MSX International Website Pages [online], MSX International, Inc. 2003 [15 pages retrieved on Dec. 1, 2003]. Retrieved from the Internet: <http://www.msxi.com/>.

neoIT Website Pages [online], neoIT 2003 [11 pages retrieved on Dec. 1, 2003]. Retrieved from the Internet: <http://www.neoit.com>.

nextSource Website Pages [online], nextSource Inc. 1999-2002 [12 pages retrieved on Dec. 2, 2003]. Retrieved from the Internet: <http://www.nextsource.com/>.

"nextSource—Enterprise-Wide Human Capital Management Solutions", product features [online], nextSource Inc. [21 pages]. Retrieved from the Internet.

"nextSource Meets the New Challenges of Human Capital Management Through ASP-based Staffing Services and Solutions", white paper [online], nextSource Inc. 2001 [8 pages]. Retrieved from the Internet.

ConsultingDirect Website Pages [online], nextSolurce Inc. 1999-2003 [1 page retrieved on Dec. 2, 2003]. Retrieved from the Internet: <http://www.consultingdirect.com/>.

OnStaff Website Pages [online], OnStaff 2003 [4 pages retrieved on Dec. 2, 2003]. Retrieved from the Internet: <http://www.onstaff.com/>.

PeopleClick Website Pages [online], PeopleClick, Inc. 2003 [17 pages retrieved on Dec. 2, 2003]. Retrieved from the Internet: <http://www.peopleclick.com/>.

PeopleSoft Website Pages [online], PeopleSoft, Inc. 2003 [34 pages retrieved on Dec. 2, 2003]. Retrieved from the Internet: <http://www.peoplesoft.com/>.

J.D. Edwards Website Pages [online], PeopleSoft 2001-2003 [12 pages retrieved on Dec. 2, 2003]. Retrieved from the Internet: <http://www.jdedwards.com/>.

ProcureStaff Website Pages [online], ProcureStaff, Ltd. 2002-2003 [11 pages retrieved on Dec. 2, 2003]. Retrieved from the Internet: <http://www.procurestaff.com/>.

"Consol—next generation—e-sourcing, procurement and spend management system", product features [online], ProcureStaff, Ltd. 2002-2003 [8 pages]. Retrieved from the Internet.

ProSavvy Website Pages [online], ProSavvy, Inc. 2003 [5 pages retrieved on Dec. 16, 2003]. Retrieved from the Internet: <http://www.prosavvy.com/>.

RecruitTrack Website Pages [online], DGCC.com LLC 2001-2003 [33 pages retrieved on Oct. 10, 2003]. Retrieved from the Internet: <http://www.recruittrack.com/>.

ResourceOcean Website Pages [online], Resource Ocean Inc. 2002 [42 pages retrieved on Dec. 2, 2003]. Retrieved from the Internet: <http://www.resourceocean.com/>.

Resume Analyzer Website Pages [online], The Globsoft Inc. 1998-2003 [6 pages retrieved on Dec. 15, 2003]. Retrieved from the Internet: <http://www.resumeanalyzer.com/>.

Resume Mirror Website Pages [online], Resume Mirror 2001 [47 pages retrieved on Oct. 10, 2003]. Retrieved from the Internet: <http://www.resumemirror.com/>.

Resume Mirror Demonstration Program [online], Resume Mirror [24 pages retrieved on Oct. 16, 2003]. Retrieved from the Internet.

"Resume Mirror Signs Exclusive Partnership with Leading Search Technology Provider Engenium for the HR & Recruiting Market", article [online], Resume Mirror [2 pages]. Retrieved from the Internet.

"Resume Mirror Joins PeopleSoft Partner Connection Program", article [online], Resume Mirror [1 page retrieved on Oct. 10, 2003]. Retrieved from the Internet.

"Resume Mirror Announces Support for Microsoft's Office Solution Accelerator Program", article [online], Resume Mirror [1 page retrieved on Oct. 10, 2003-10-10]. Retrieved from the Internet.

RINGO Website Pages [online], RINGO 2002 [13 pages retrieved on Dec. 3, 2003]. Retrieved from the Internet: <http://www.goringo.com/>.

SkillBay Website Pages [online], SkillBay.com 2000 [38 pages retrieved on Dec. 3, 2003]. Retrieved from the Internet: <http://www.skillbay.com/>.

SonicRecruit Website Pages [online], cytiva, inc. 2003 [25 pages retrieved on Oct. 10, 2003]. Retrieved from the Internet: <http://www.sonicrecruit.com/>.

SpiderXchange Website Pages [online], SpiderXchange.com, Inc. 2001 [13 pages retrieved on Dec. 3, 2003]. Retrieved from the Internet: <http://www.spiderxchange.com/>.

WorkCard Website Pages [online], The WorkCard Company, Inc. 2002 [7 pages retrieved on Dec. 3, 2003]. Retrieved from the Internet: <http://www.workcard.com/>.

TKO Systems Website Pages [online], TKO Systems, Ltd. [3 pages]. Retrieved from the Internet: <http://www.tkosystems.com/>.

Top Echelon Website Pages [online], Top Echelon Network, Inc 1999-2002 [1 page retrieved on Dec. 3, 2003]. Retrieved from the Internet: <http://www.topechelon.com/>.

Big Biller Website Pages [online], Top Echelon 2003 [19 pages retrieved on Dec. 3, 2003]. Retrieved from the Internet: <http://www.bigbiller.com/>.

Unicru Website Pages [online], Unicru 2003 [30 pages retrieved on Nov. 18, 2003]. Retrieved from the Internet: <http://www.unicru.com/>.

Unicru Website Pages [online], Unicru 2003 [25 pages retrieved on Nov. 25, 2003]. Retrieved from the Internet.

Unicru Website Pages [online], Unicru 2003 [263 pages retrieved on Dec. 11, 2003]. Retrieved from the Internet: <http://www.unicru.com/>.

Unicru Website Pages [online], Unicru 2003 [2 pages retrieved on Dec. 12, 2003]. Retrieved from the Internet: <http://www.unicru.com/>.

Unicru Website Pages [online], Unicru 2003 [4 pages retrieved on Dec. 13, 2003]. Retrieved from the Internet: <http://www.unicru.com/>.

"Unicru—Screening out unqualified candidates: Unicru Smart Match", presentation [online], Unicru [35 pages]. Retrieved from the Internet.

"CVS Looks to Turnaround Employee Turnover", article [online], Top of the Net [1 page]. Retrieved from the Internet.

"Hr Empowers Employees", article [online], Retail Info Systems News [1 page]. Retrieved from the Internet.

"5 Steps to Reducing Labor Pains", article [online], Hospitality Technology Magazine [3 pages retrieved on Dec. 11, 2003]. Retrieved from the Internet: <http://www.htmagazine.com/archive/htjuly/art5.htm>.

eTrucker Website Pages [online], eTrucker [1 page retrieved on Dec. 11, 2003]. Retrieved from the Internet: <http://www.etrucker.com/apps/news/article.asp?id=37983>.

"The Driver Shortage: It never goes away", article [online], PRIMEDIA Business Magazines & Media Inc. 2003 [3 pages retrieved on Dec. 11, 2003]. Retrieved from:the Internet: <http://www.fleetowner.com/magazinearticle.asp?magazinearticleid=174730&magazineid...>.

"Kroger uses a web-based hiring system to cut employee turnover", article [online], Vertical Web Media 2002 [1 page retrieved on Dec. 11, 2003-12-11]. Retrieved from the Internet: <http://www.internetretailer.com/printArticle.asp?id=8617>.

"Speeding the process—HR software enables companies to save time, money and headaches involved with hiring workers", article [online], American City Business Journals Inc. 2002 [3 pages retrieved on Dec. 11, 2003]. Retrieved from the Internet: <http://triad.bizjournals.com/triad/stories/2002/10/07/focusl.html?t=printable>.

"Kroger hiring kiosks get green light—Grocer to expand test after positive startup", article [online], American City Business Journals Inc. 2003 [2 pages retrieved on Dec. 11, 2003]. Retrieved from the Internet: <http://cincinnati.bizjournals.com/cincinnati/stories/2003/02/24/story4.html?t=printable>.

"Unicru: Taking It to the Source", article [online], Hurwitz Group, Inc. 2001 [2 pags]. Retrieved from the Internet.

"Back to Basics: Harnessing the Power of Hourly Workers", article [online], Summit Strategies 2003 [2 pages retrieved on Dec. 11, 2003]. Retrieved from the Internet: <http://www.summitstrat.com/assets/ALfebCOL>.

Kutik, William M., "Searching and Matching Candidates to Jobs: Fixing the Weak Link in Recruiting Technology", white paper [online], [11 pages]. Retrieved from the Internet.

COMSYS Website Pages [online], COMSYS Information Technology Service, Inc. [29 pages retrieved on Dec. 3, 2003]. Retrieved from the Internet: <http://www.comsys.com>.

"Vendor One—A COMSYS Solution—One Call.•,It's Done.", product features [online], COMSYS Information Technology Service, Inc. 2001 [6 pages]. Retrieved from the Internet.

"COMSYS—The Art of Progress", product features [online], COMSYS Information Technology Service, Inc. 2002 [15 pages]. Retrieved from the Internet.

"COMSYS—Staffing Solutions—Meeting the demands of business in real-time", product features [online], COMSYS Information Technology Service, Inc. 2003 [6 pages]. Retrieved from the Internet.

Venturi Website Pages [online], Venturi Partners [14 pages retrieved on Dec. 3, 2003]. Retrieved from the Internet: <http://www.venturipartners.com>.

Venturi vWorx Website Pages [online], Venturi Partners [4 pages retrieved on Dec. 3, 2003]. Retrieved from the Internet: <http://www.vworx.com>.

Venturi Technology Partners Website Pages [online], Venturi Technology Partners [1 page retrieved on Dec. 3, 2003]. Retrieved from the Internet: <http://www.venturitechnologypartners.com>.

VirtualEdge Website Pages [online], VirtualEdge Corporation 2003 [18 pages retrieved on Oct. 10, 2003]. Retrieved from the Internet: <http://www.virtualedge.com>.

VirtualEdge Website Pages [online], VirtualEdge Corporation 2003 [1 page retrieved on Oct. 10, 2003]. Retrieved from the Internet: <http://www.virtualedge.apply2jobs.com/INDEX.CFM>.

RecruitSoft Website Pages [online], RecruitSoft, Inc. [24 pages retrieved on Dec. 3, 2003]. Retrieved from the Internet: <http://www.whiteamber.com>.

"White Amber—What we do", product features [online], White Amber, Inc. 1999-2003 [2 pages]. Retrieved from the Internet.

"How White Amber works: Looking under the hood", product features [online], White Amber, Inc. [3 pages]. Retrieved from the Interne: <http://www.whiteamber.com>.

WorkforceLogic Website Pages [online], WorkforceLogic.com [37 pages retrieved on Dec. 3, 2003]. Retrieved from the Internet: <http://www.workforcelogic.com>.

Workplace Technology Ventures Website Pages [online], Workplace Technology Ventures 2002 [28 pages retrieved on Dec. 3, 2003]. Retrieved from the Internet: <http://www.workplace.net>.

Xperius Website Pages [online], Xperius 2003 [20 pages retrieved on Dec. 12, 2003]. Retrieved from the Internet: <http://www.xperius.com>.

RECRUITMENT VENDOR MANAGEMENT SYSTEM AND METHOD

CROSS-REFERENCE TO A RELATED APPLICATION

This application for letters patent is a continuation of U.S. patent application Ser. No. 10/679,432, filed on Oct. 7, 2003, now U.S. Pat. No. 7,650,286, which is a continuation-in-part of and incorporates by reference U.S. patent application Ser. No. 10/418,142, filed on Apr. 18, 2003, now U.S. Pat. No. 7,711,573. The assignee is the same in this continuation patent application, the continuation-in-part patent application, and the parent patent application.

FIELD OF THE INVENTION

The present invention relates, in general, to computing systems and data processing. In particular, the present invention is a computer system and method for identifying a matching resume from the submission of applicant resumes to an employer in response to a job description for job opening with the employer.

BACKGROUND OF THE INVENTION

When an employer decides to hire a new employee, a hiring manager composes a job description that states the requirements for the new employee. The requirements typically include characteristics and qualifications for the new employee. The hiring manager or the employer initiates the process of hiring the new employee, the job opening fulfillment process, by advertising the job description to the public or a focused group of recruitment vendors. In response to the employer posting the job description, the hiring manager receives resumes either directly from applicants or from a recruitment vendor who represents applicants.

A resume, or curriculum vitae, summarizes a candidate's career and qualifications. The resume is a mechanism to convey personal and business-related characteristics that the candidate believes to be relevant to a prospective employer. The resume typically includes the candidate's career objective, personal interests, professional affiliations, educational background, employment history, and a description of work experience.

The candidate review portion of the job opening fulfillment process historically is a manual process for the hiring manager. The hiring manager, or a representative of the hiring manager, begins candidate review by reviewing each paper or electronic resume received in response to posting the job description. Throughout candidate review, the hiring manager, or a representative of the hiring manager, keeps the requirements of the position in mind. For each resume, the hiring manager, or a representative of the hiring manager, decides whether the resume describes qualifications that can satisfy the job requirements. If a resume may satisfy the job requirements, the hiring manager, or a representative of the hiring manager, contacts the candidate, or a recruitment vendor representing the candidate, to invite the candidate for an interview. If the candidate accepts the invitation, the interview and a number of additional steps will help the hiring manager to decide whether to hire the candidate. One disadvantage of this process is the time required by the hiring manager, or a representative of the hiring manager, to review resumes that might not possibly qualify for the position. The hiring manager, or a representative of the hiring manager, reviews a number of resumes for the purpose of narrowing them down to a few resumes that describe candidates who might qualify for the position and warrant an interview or hire. Furthermore, the accuracy of the manual process to qualify candidates for the subsequent steps in the interviewing and hiring process depends on the accuracy of the resume review conducted by the hiring manager, or a representative of the hiring manager. This increases the likelihood that the hiring manager, or a representative of the hiring manager, will miss the resume of a qualified potential candidate or promote the resume of an unqualified potential candidate for consideration. Thus, the manual nature of candidate review and the job opening fulfillment process does not lend itself to a thorough, careful, and timely review of submitted resumes.

Prior electronic systems improved upon the manual process by creating tools to scan the text of the resume for key words specified in the job requirements of the job description. Other prior electronic systems have required the candidate, or a recruitment vendor representing the candidate, to complete and submit an electronic profile to specify the candidate's skills and qualifications. Alternatively, the other prior art electronic systems have required the candidate, or a recruitment vendor representing the candidate, to specify whether the candidate has the required experience and the required duration for each of the job requirements of the job description. Still other prior electronic systems perform a combination of the previously mentioned scenarios. The impetus for developing the prior electronic systems was to give the hiring manager, or a representative of the hiring manager, some level of assistance when qualifying a resume submitted for review. These prior systems typically scanned the resume using a textual word search of the resume content. Although at times, the textual word search accounted for alternative terminology, spelling, format, or case differences between the job requirements and the stated text in the resume, the textual word search never took into account the duration of experience associated with a word or phrase in the resume. The duration of experience was only searchable after the candidate, or a recruitment vendor representing the candidate, has entered it in the profile. The manual review of resumes for a specific duration of experience in a specific field or skill is a timely and error prone process. The disadvantages of the prior art include missing a qualified candidate, considering an unqualified candidate for an interview, and erroneously accusing a recruitment vendor of submitting unacceptable candidates to the hiring manager, or a representative of the hiring manager. The metrics used to evaluate the quality of the resume submissions by a vendor was constantly erroneous and skewed by the inaccurate evaluation of submitted resumes. Thus, the prior art systems not only fail to identify qualified candidates, but also recommend the review of unqualified candidates thereby wasting the valuable time of all the parties involved in the hiring process.

Other prior electronic systems attempted to solve the vulnerability of the manual process of reviewing resumes by relying on the candidate, or a recruitment vendor representing the candidate, to input the candidate's duration of experience in a skill or experience-related phrase that the job description requires. A skill or experience-related phrase is a sequence of one or more consecutive words. A word is a sequence of one or more consecutive printable characters, numbers, or symbols. These prior systems rely on the candidate, or a recruitment vendor representing the candidate, to enter correctly and accurately the duration of experience possessed by the candidate for each skill or experience-related phrase required by the job description. There are three principal disadvantages to these prior systems.

First, prior electronic systems provide a very time consuming set-up for the candidate, a recruitment vendor representing the candidate, a hiring manager, and a representative of the hiring manager. For each required skill or experience-related phrase in each job description, the candidate must enter or have entered the required skill or experience-related phrase and the associated duration of experience. This becomes a particularly daunting task when one considers that an applicant may want to apply for a number of job descriptions, each having an individual list of required qualifications.

Second, prior electronic systems relied on text word searches or knowledge-based searches combined with text word searches, both of which did not accommodate a job requiring a duration of experience for each of the required skills. These systems cannot consider a skill or experience-related phrase and its possible duration of experience electronically as soon as the resume arrives into the system. To match a resume to the job requirements, the prior art calculated the duration of experience for a skill or experience-related phrase manually, never electronically. The hiring manager, or a representative of the hiring manager, manually tallied the duration of experience for each required skill or experience-related phrase, or its alternatives to determine whether the resume meets the required duration of experience in each required skill or experience-related phrase, or its alternative.

Third, the manual process introduces the potential for human error. Adherence of the submitted resumes to the required duration of experience for the required skill or experience-related phrase may assess the candidate, or a recruitment vendor representing the candidate, either wrongfully or unjustifiably. The process may turn down candidates when they shouldn't be and vice versa. The recruitment vendor may be misjudged on the quality of the resumes that they submit and whether they adhere to the requirements of job descriptions.

Thus, there is a need for a recruitment vendor management system that includes matching tools that accurately assess whether a submitted resume meets a job description. The system will improve the evaluation process of applying candidates. Additionally, the system will improve the evaluation process of the recruitment vendor who submits candidates to the hiring manager, or a representative of the hiring manager. The system will save time and money during the review of resumes by the hiring manager, or a representative of the hiring manager. The system will also improve the time required to respond to applying candidates, allowing the candidates to know sooner whether they are being considered for a job description. The system determines whether a resume includes the qualifications or job requirements sought, and also identifies and rejects resumes that cannot possibly include the qualifications or job requirements sought. Each job requirement for a job description comprises a required skill or experience-related phrase, and a minimum required duration of experience in the skill or experience-related phrase. The system accommodates resumes that contain a narrative of job experiences within a duration or date range. The contents of the resume should suffice when determining whether the candidate meets the required minimum duration in a specific skill or experience-related phrase without relying on the candidate to enter the data into a profile. The present invention addresses these needs.

SUMMARY OF THE INVENTION

A computer system, method, and computer program product for identifying a matching resume for a job description. The method comprises receiving and storing the job description that includes job requirements, each job requirement comprising a required skill or experience-related phrase and a required term of experience for the required skill or experience-related phrase. The method further comprises receiving and storing resumes, each resume including skill or experience-related phrases, wherein the skill or experience-related phrases includes the required skill or experience-related phrase for one of the job requirements. The method further comprises, for each resume, computing a term of experience for the required skill or experience-related phrase for each job requirement, and determining whether the resume is the matching resume that satisfies the job description. The resume further includes a contextual use for each skill or experience-related phrase, the contextual use having an experience range. The term of experience for the required skill or experience-related phrase being derived from experience range associated with the contextual use. When the experience range is zero, the term of experience is set to zero. When the experience range is greater than zero, the term of experience is the time difference between the start time and the end time of the experience range. When the required skill or experience-related phrase for each job requirement that is a repeated entry, the computation of the term of experience is the sum of the time differences for each repeated entry that is in a different experience range. To satisfy the job description, the matching resume includes the required skill or experience-related phrase for each job requirement, and the term of experience for the required skill or experience-related phrase in the resume is greater than or equal to the required term of experience. The matching resume may also satisfy the job description by including an alternative required skill or experience-related phrase.

The method further comprises displaying the matching resume on a display screen. When the display is segmented into three portions, the first portion shows a list of resumes, the second portion shows attributes extracted from the matching resume, and the third portion shows the matching resume. When the display is segmented into two portions, either the first portion shows attributes extracted from the matching resume and the second portion shows the matching resume, or the first portion shows a list of resumes and the second portion shows the matching resume. To display the matching resume, the method further comprises marking each occurrence of the required skill or experience-related phrase for each said at least one job requirement. The marking includes highlighting, or display in reverse video, each occurrence of the required skill or experience-related phrase.

The preceding summary of the invention is presented to assist with understanding the invention and is neither an exhaustive nor an exclusive summary. It should be understood that this summary of the invention is not representative of all of the inventions defined by the claims, to be considered limitations on the invention as defined by the claims, or limitations on equivalents to the claims. Thus, this summary of the invention should not be considered dispositive when determining equivalence. Additional features and advantages of the invention will become apparent from a review of the detailed description, figures, and claims.

FEATURES AND ADVANTAGES

A recruitment vendor management system allows a candidate, or a recruitment vendor representing the candidate, to submit an electronic, or digital, resume without completing forms or profiles that assign a duration of experience to a predefined set of skill or experience-related phrases. For each job requirement, the system extracts the required skill or experience-related phrases from the electronic resume and computes a maximum possible duration of experience for each required skill or experience-related phrase.

A broad term or phrase is a term or phrase that another term or phrase implies (i.e., a broad phrase is an implied phrase). For instance, "human" is a broad term for "soldier", "banker" is a broad term for "lending officer", and "medical doctor" is a broad term for "psychiatrist" or "neurologist". Since "medical doctor" is a synonym for "physician", the phrase "medical doctor" is a broad phrase for "physician" and "physician" is a broad term for "medical doctor". The phrase "speaks Spanish very well" is a synonym for the phrase "fluent in Spanish" and therefore, both phrases are broader than each other. However, "fluent in Spanish" is a broad term for "Spanish author". A candidate's duration of experience in a broader skill or experience-related phrase is at least the same duration of experience in a narrower phrase from which the broader phrase is implied. The duration of experience in the broader skill or experience-related phrase would be greater than the duration of experience in a narrower skill or experience-related phrase from which it is implied only if the broader skill or experience-related phrase or any of its other narrower skill or experience-related phrases additionally appear in experience ranges different from the experience range containing the earlier mentioned narrower skill or experience-related phrase.

A narrow term or phrase is a term or a phrase that implies another term or phrase. The latter term or phrase is the broad term of the narrow term that implies it. The term 'imply' is the Aristotelian implication in logic as in the statement "If A then B". In this statement, the assumption is that A implies B. Therefore, A is a narrow term of B and B is a broad term of A.

The recruitment vendor management system creates, for each skill or experience-related phrase, a mapping to all of the narrow terms or phrases. However, assuming a mapping to narrow terms or phrases exists for a skill or experience-related phrase, a resume that includes the skill or experience-related phrase may not include any of the narrow terms or phrases. A resume satisfies a required skill or experience-related phrase when the resume includes the required skill or experience-related phrase, or any of its narrow phrases, and when a combined duration of experience in the required skill or experience-related phrase and all of its narrow phrases is greater than or equal to the required duration of experience in the required skill or experience-related phrase. The combined duration of experience, which is the summation of the duration of experience in the required skill or experience-related phrase and all its narrow phrases without summing an experience range more than once, is the maximum possible duration of experience.

The recruitment vendor management system assists a hiring manager, or a representative of the hiring manager, to accept or reject a submitted resume for an interview or consideration without having to perform a manual review of skill or experience-related phrases. The resume for any candidate selected for consideration will possibly have the required skill or experience-related phrases at the required duration of experience. The system requires the received resume to contain job narratives that contain the skill or experience-related phrases. The system accommodates the written form of the resume to include a from-date and a to-date for each of the various jobs held by the candidate, as well as, some form of duration or date range associated with each of the various jobs held by the candidate. The system only denies consideration for a candidate when the candidate's resume could not have included the required skill or experience-related phrases for the required duration of time.

The recruitment vendor management system may determine that a resume is a match for a job description. The resume matches a job description that includes a job requirement for a skill or experience-related phrase when the maximum possible duration of experience in the skill or experience-related phrase is greater than or equal to the required duration of experience in the skill or experience-related phrase.

When the required skill or experience-related phrase maps into one or more narrow phrases, the resume matches a job description that includes a job requirement for such a skill or experience-related phrase when the combined maximum possible duration of experience in the skill or experience-related phrase and all its narrow phrases is greater than or equal to the required duration of experience in the skill or experience-related phrase.

When the job requirement of a job description requires that the experience in a certain skill or experience-related phrase be obtained at a specific time-range in the past, the resume matches such job description when the resume satisfies the requirement that the experience in the skill or experience-related phrase was gained over a duration that contains the specific time-range.

When a job description includes multiple job requirements, a resume matches such a job description when the resume matches all of its job requirements.

When a job description requires that at least one or more of a number of job requirements be met, then a resume matches such a job description when the resume matches any of these alternative job requirements.

When a job description includes multiple job requirements each of which can be substituted by possible alternative job requirements, then a resume matches such a job description when the resume matches the job requirements or their alternative requirements.

Additionally, a resume might not be a match for a job description when the resume matches another excluding job description.

After determining whether a resume is a match, the system notifies the hiring manager, or a representative of the hiring manager, accordingly. The hiring manager then reviews the resume and arranges an interview for the matching candidate by contacting the candidate or his submitting vendor. Alternatively, the hiring manager, or a representative of the hiring manager, may by-pass an interview and proceed to offer the candidate a job. However, the hiring manager, or a representative of the hiring manager, may decide to not consider the matching candidate for an interview or the job for reasons beyond the stated requirements in the job description. To assist in the decision process, the system may be configured to generate a summary of the matching candidate's background that highlights the experiences most pertinent to the job requirements. Alternatively, the system may also outline why a candidate's resume is not a match for a job requirement by identifying the candidate's lack of experience or duration thereof in a required skill or experience-related phrase.

The preceding features and advantages are presented to assist with understanding the invention and are neither an exhaustive nor an exclusive summary. It should be understood that these features and advantages are not representative of all of the inventions defined by the claims, to be considered limitations on the invention as defined by the claims, or limitations on equivalents to the claims. Thus, these features and advantages should not be considered dispositive when determining equivalence. Additional features and advantages of the invention will become apparent from a review of the detailed description, figures, and claims.

BRIEF DESCRIPTION OF THE DRAWINGS

The accompanying figures best illustrate the details of the recruitment vendor management system and method, both as to its structure and operation. Like reference numbers and designations in these figures refer to like elements.

DETAILED DESCRIPTION OF THE INVENTION

Figure 1:
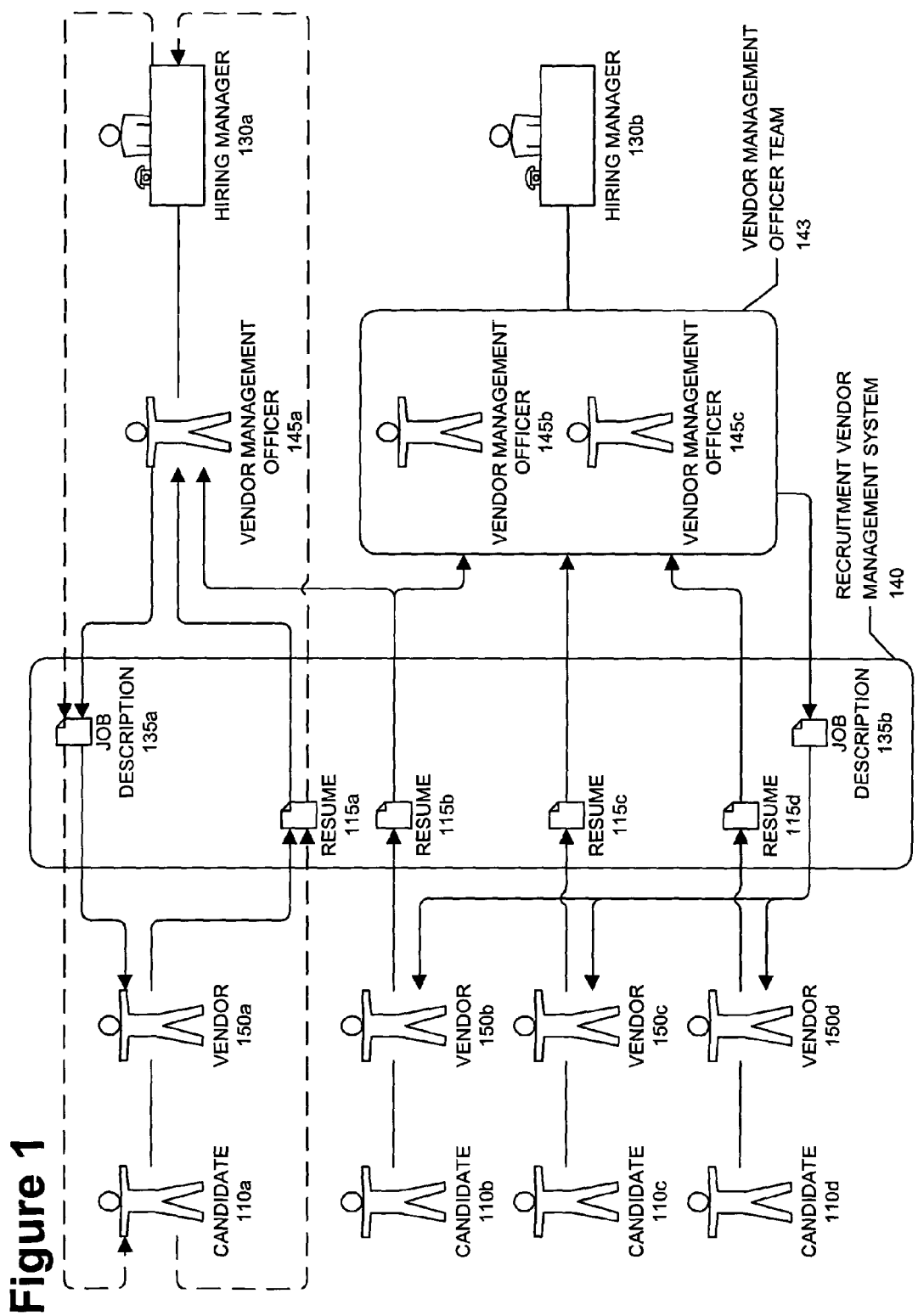
FIG. 1 is a block diagram that illustrates the integration of recruitment vendor management system 140 into an operating environment for a traditional job opening fulfillment or employment-seeking situation, in accordance with one embodiment of the present invention.

FIG. 1 is a block diagram that illustrates the integration of recruitment vendor management system 140 into an operating environment for a job opening fulfillment situation. As shown in FIG. 1, recruitment vendor management system 140 is an interface between a hiring company and vendor 150a. The hiring company is a corporate or government entity that desires to hire a new employee to fill a specific job opening. Hiring manager 130a and vendor management officer 145a are representatives of the hiring company responsible for evaluating the potential candidates such as candidate 110a for the specific job opening. Vendor 150a is a corporate or government entity that has a business relationship with an entity such as the hiring company to provide qualified resumes to fill specific job openings.

Hiring manager 130a initiates the job opening fulfillment process by authoring job description 135a to describe the characteristics and qualifications required for a new employee of the hiring company. Hiring manager 130a communicates job description 135a to vendor management officer 145a. The communication includes digital transfer of job description 135a or a location of job description 135a, and communication of a portion of job description 135a. Vendor management officer 145a stores job description 135a in recruitment vendor management system 140. In another embodiment, hiring manager 130a stores job description 135a in recruitment vendor management system 140. In yet another embodiment, vendor management officer 145a modifies job description 135a and stores the modified job description in recruitment vendor management system 140. In this embodiment, vendor management officer 145a optionally reviews the modified job description with hiring manager 130a.

Vendor 150a retrieves job description 135a from recruitment vendor management system 140. Vendor 150a communicates job description 135a to candidate 110a. The communication includes digital transfer of job description 135a or a location of job description 135a, and communication of a portion of job description 135a. In another embodiment, a notification message sent by recruitment vendor management system 140 triggers vendor 150a to retrieve job description 135a. In this embodiment, recruitment vendor management system 140 sends the notification message because either system preferences or history indicates that vendor 150a has an interest in job description 135a. In yet another embodiment, candidate 110a retrieves job description 135a from recruitment vendor management system 140.

If candidate 110a is interested in job description 135a, candidate 110a authors resume 115a and transfers a copy of resume 115a to vendor 150a. The transfer includes digital transfer of resume 115a or a location of resume 115a, and communication of a portion of resume 115a. Vendor 150a compares resume 115a to the characteristics and qualifications specified in job description 135a. If vendor 150a determines that resume 115a includes the characteristics and qualifications, vendor 150a stores resume 115a in recruitment vendor management system 140. In another embodiment, candidate 110a stores resume 115a in recruitment vendor management system 140. In yet another embodiment, vendor 150a modifies resume 115a and stores the modified resume in recruitment vendor management system 140. In this embodiment, vendor 150a optionally reviews the modified resume with candidate 110a. In another embodiment, candidate 110a communicates the contents of resume 115a to vendor 150a and relies upon vendor 150a to store resume 115a in recruitment vendor management system 140.

In one embodiment, if resume 115a includes the characteristics and qualifications specified in job description 135a, recruitment vendor management system 140 alerts vendor management officer 145a. Vendor management officer 145a optionally communicates resume 115a to hiring manager 130a. In another embodiment, if resume 115a includes the characteristics and qualifications specified in job description 135a, recruitment vendor management system 140 alerts hiring manager 130a. The communication includes digital transfer of resume 115a or a location of resume 115a, and communication of a portion of resume 115a. Hiring manager 130a evaluates resume 115a to decide whether to interview candidate 110a for the specific job opening. In another embodiment, a notification message sent by recruitment vendor management system 140 triggers vendor management office 145a to retrieve resume 115a. In this embodiment, recruitment vendor management system 140 sends the notification message because resume 115a matches job description 135a. In yet another embodiment, vendor management officer 145a or hiring manager 130a retrieve resume 115a from recruitment vendor management system 140.

Job description 135a and resume 115a are in an electronic format. As shown in FIG. 1, the transfer of job description 135a and resume 115a involve posting to recruitment vendor management system 140. In alternative embodiments, the transfer may utilize electronic mail, the file transfer protocol, or facsimile. In another embodiment, job description 135a and resume 115a are posted as image files and recruitment vendor management system 140 recognizes the characters of the image to generate a standard digital document. The electronic format includes any standard digital document format comprising text file formats such as American Standard Code for Information Interchange (ASCII) or Extended Binary Coded Data Interchange Code (EBCDIC), word processor file formats such as Microsoft Word or WordPerfect, and markup language file formats such as Standard Generalized Markup Language (SGML), HyperText Markup Language (HTML), or eXtensible Markup Language (XML).

An alternative embodiment to that shown in FIG. 1 includes a resume database in recruitment vendor management system 140. Prior to initiation of the job opening fulfillment process, candidate 110a authors resume 115a and either stores resume 115a in the resume database or transfers resume 115a to vendor 150a for storage in the resume database. In this alternative embodiment, storing job description 135a in recruitment vendor management system 140 triggers recruitment vendor management system 140 to search the resume database for any resume that possibly matches job description 135a. If resume 115a is a possible match, recruitment vendor management system 140 sends a notification message to vendor management officer 145a to retrieve resume 115a. In yet another embodiment, recruitment vendor management system 140 sends the notification message to hiring manager 130a.

FIG. 1 also illustrates the integration of vendor management officer team 143 into recruitment vendor management system 140. Vendor management officer team 143 comprises vendor management officer 145b and vendor management officer 145c. However, it is to be understood that vendor management officer team 143 may include any number of vendor management officers. Hiring manager 130b authors job description 135b and communicates it to vendor management officer team 143. Vendor management officer 145b or vendor management officer 145c store job description 135b in recruitment vendor management system 140. Vendor 150b, vendor 150c, and vendor 150d were selected to work with vendor management officer team 143. Vendor 150b, vendor 150c, and vendor 150d retrieve job description 135b from recruitment vendor management system 140 and communicate job description 135b to candidate 110b, candidate 110c, and candidate 110d. If candidate 110b, candidate 110c, and candidate 110d are interested in job description 135b, they author and transfer in an electronic format respectively, resume 115b, resume 115c, and resume 115d to vendor 150b, vendor 150c, and vendor 150d. Vendor 150b, vendor 150c, and vendor 150d store resume 115b, resume 115c, and resume 115d in recruitment vendor management system 140 in response to job description 135b. If resume 115c includes the characteristics and qualifications stated in job description 135b, recruitment vendor management system 140 alerts a member of vendor management officer team 143. The member of vendor management officer team 143 who was alerted optionally reviews resume 115c, or interview candidate 110c as an additional screening step, and optionally transfers resume 115c to hiring manager 130b for review. As shown in FIG. 1, vendor 150b also stores an instance of resume 115b in recruitment vendor management system 140 in response to job description 135a stored by vendor management officer 145a. If resume 115b includes the characteristics and qualifications stated in job description 135a, recruitment vendor management system 140 also sends a notification message to vendor management officer 145a. Hence, vendor management officer 145a also optionally reviews resume 115b, or interviews candidate 110b as an additional screening step, and optionally transfers resume 115b to hiring manager 130a for review. Even though FIG. 1 only illustrates the interaction of candidate 110a, candidate 110b, candidate 110c, candidate 110d, vendor 150a, vendor 150b, vendor 150c, vendor 150d, vendor management officer 145a, vendor management officer 145b, vendor management officer 145c, vendor management officer team 143, hiring manager 130a, and hiring manager 130b, it is to be understood that recruitment vendor management system 140 can accommodate any number of candidates, recruiters, and hiring managers.

Figure 2:
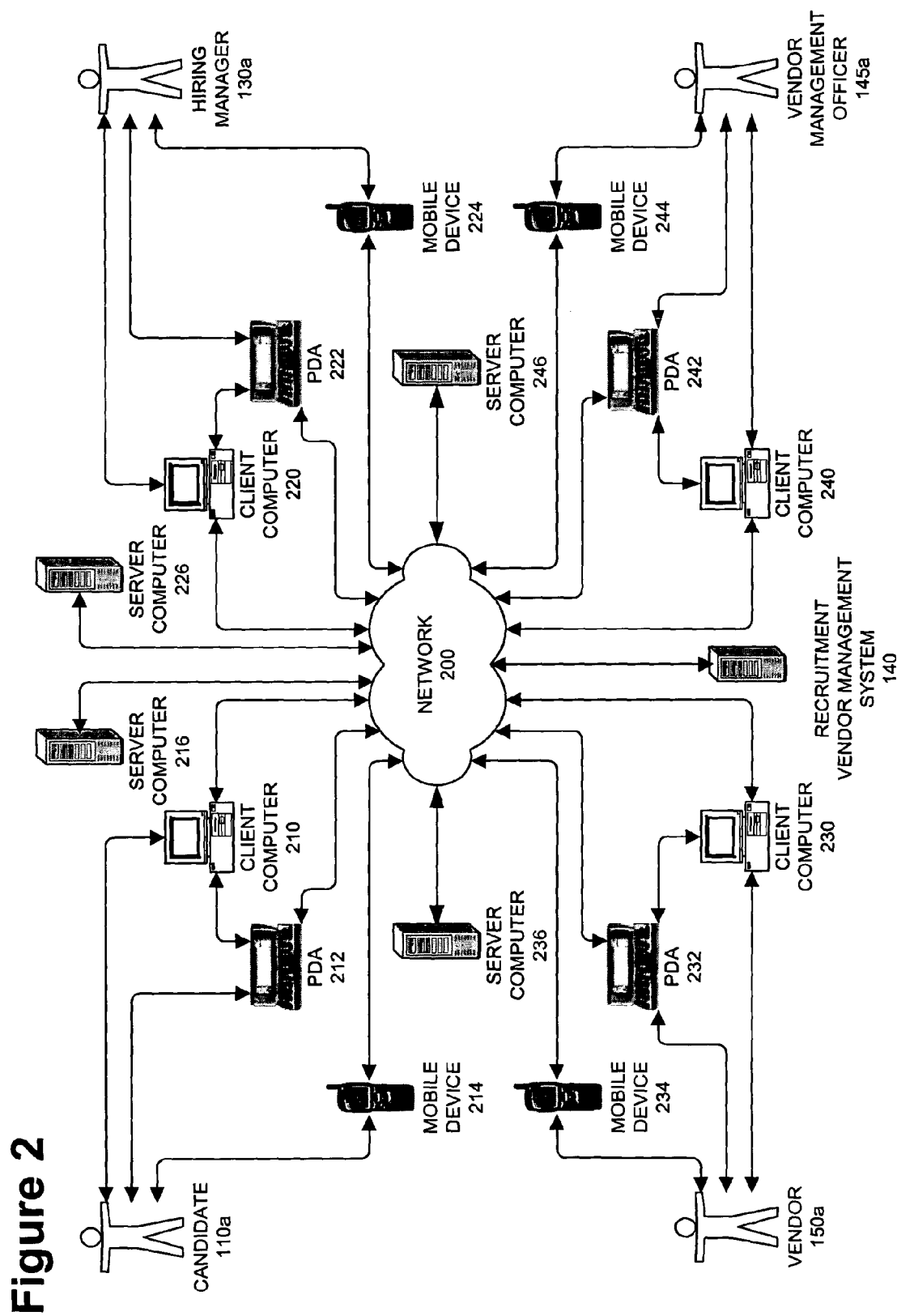
FIG. 2 is a network diagram that illustrates exemplary input and hardware components that may form the operating platform for recruitment vendor management system 140 shown in FIG. 1 in accordance with one embodiment of the present invention.

FIG. 2 is a network diagram that illustrates exemplary input and hardware components that may form the operating platform for recruitment vendor management system 140 shown in FIG. 1. Network 200, as shown in FIG. 2, is a public communication network that connects and enables data transfer between the hardware components and recruitment vendor management system 140.

Network 200 shown in FIG. 2 is a public communication network. However, recruitment vendor management system 140 also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA) or Code Division Multiple Access (CDMA) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization, such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

The hardware components shown in FIG. 2 include client computer 210, personal digital assistant (PDA) 212, mobile device 214, server computer 216, and comparable devices. Client computer 210 is a general-purpose personal computer, workstation, or laptop configured to connect to network 200. PDA 212 is a portable handheld device, such as a Palm handheld or Microsoft Pocket PC, configured to connect to network 200 either directly or via client computer 210. When PDA 212 disconnects from client computer 210, PDA 212 operates upon downloaded data stored locally until reestablishing the connection to client computer 210 and synchronizing the data. Mobile device 214 is a portable wireless device that connects to recruitment vendor management system 140 via network 200. In another embodiment, mobile device 214 is a land-based or wireless telephone that connects to recruitment vendor management system 140 via network 200. Server computer 216 is a general-purpose network computer that manages network resources and accepts connections from computers such as client computer 210 via network 200. It is to be understood that the hardware components shown in FIG. 2 are illustrative examples that demonstrate the functions performed by a component and are not intended to limit this invention.

The hardware components shown in FIG. 2 also include client computer 230, PDA 232, mobile device 234, server computer 236, and comparable devices. Client computer 230 is a general-purpose personal computer, workstation, or laptop configured to connect to network 200. PDA 232 is a portable handheld device, such as a Palm handheld or Microsoft Pocket PC, configured to connect to network 200 either directly or via client computer 230. When PDA 232 disconnects from client computer 230, PDA 232 operates upon downloaded data stored locally until reestablishing the connection to client computer 230 and synchronizing the data. Mobile device 234 is a portable wireless device that connects to recruitment vendor management system 140 via network 200. In another embodiment, mobile device 234 is a land-based or wireless telephone that connects to recruitment vendor management system 140 via network 200. Server computer 236 is a general-purpose network computer that manages network resources and accepts connections from computers such as client computer 230 via network 200. It is to be understood that the hardware components shown in FIG. 2 are illustrative examples that demonstrate the functions performed by a component and are not intended to limit recruitment vendor management system 140.

In one embodiment, candidate 110a operates the hardware components shown in FIG. 2 to create and submit resume 115a in an electronic format. After creating resume 115a, candidate 110a operates the hardware components shown in FIG. 2 to access network 200 and sends resume 115a to vendor 150a. In another embodiment, vendor 150a operates the hardware component to access network 200 and relies upon programmed instructions residing in recruitment vendor management system 140 to post resume 115a or create and store resume 115a on recruitment vendor management system 140 in response to job description 135a for a job opening. In another embodiment, vendor 150a operates the hardware component to access recruitment vendor management system 140 via network 200 and verify or update the content of resume 115a that was previously transmitted to recruitment vendor management system 140. In another embodiment, vendor 150a operates the hardware component to access recruitment vendor management system 140 and submit resume 115a for a job description posted by a vendor management officer such as vendor management officer 145a. In one embodiment, the hardware component performs a resume "bulk load" by accessing recruitment vendor management system 140 via network 200 to transmit at least one resume using a transmission protocol such as the File Transfer Protocol (FTP). In another embodiment, the resume bulk load is an automatic, scheduled process that occurs periodically.

The hardware components shown in FIG. 2 also include client computer 220, PDA 222, mobile device 224, server computer 226, and comparable devices. Client computer 220 is a general-purpose personal computer, workstation, or laptop configured to connect to network 200. PDA 222 is a portable handheld device, such as a Palm handheld or Microsoft Pocket PC, configured to connect to network 200 either directly or via client computer 220. When PDA 222 disconnects from client computer 220, PDA 222 operates upon downloaded data stored locally until reestablishing the connection to client computer 220 and synchronizing the data. Mobile device 224 is a portable wireless device that connects to recruitment vendor management system 140 via network 200. In another embodiment, mobile device 224 is a land-based or wireless telephone that connects to recruitment vendor management system 140 via network 200. Server computer 226 is a general-purpose network computer that manages network resources and accepts connections from computers such as client computer 220 via network 200. It is to be understood that the hardware components shown in FIG. 2 are illustrative examples that demonstrate the functions performed by a component and are not intended to limit recruitment vendor management system 140.

The hardware components shown in FIG. 2 also include client computer 240, PDA 242, mobile device 244, server computer 246, and comparable devices. Client computer 240 is a general-purpose personal computer, workstation, or laptop configured to connect to network 200. PDA 242 is a portable handheld device, such as a Palm handheld or Microsoft Pocket PC, configured to connect to network 200 either directly or via client computer 240. When PDA 242 disconnects from client computer 240, PDA 242 operates upon downloaded data stored locally until reestablishing the connection to client computer 240 and synchronizing the data. Mobile device 244 is a portable wireless device that connects to recruitment vendor management system 140 via network 200. In another embodiment, mobile device 244 is a land-based or wireless telephone that connects to recruitment vendor management system 140 via network 200. Server computer 246 is a general-purpose network computer that manages network resources and accepts connections from computers such as client computer 240 via network 200. It is to be understood that the hardware components shown in FIG. 2 are illustrative examples that demonstrate the functions performed by a component and are not intended to limit recruitment vendor management system 140.

In one embodiment, hiring manager 130a operates the hardware component shown in FIG. 2 to access recruitment vendor management system 140 via network 200. In one embodiment, hiring manger 130a relies upon programmed instructions residing in recruitment vendor management system 140 to create a job description that includes at least one requirement. In another embodiment, hiring manger 130a relies upon programmed instructions residing in recruitment vendor management system 140 to receive a resume in response to a job description already posted on recruitment vendor management system 140. In yet another embodiment, hiring manger 130a relies upon programmed instructions residing in recruitment vendor management system 140 to receive a resume in anticipation of a job opening that might become available in the future.

In one embodiment, vendor management officer 145a operates the hardware component shown in FIG. 2 to access recruitment vendor management system 140 via network 200. In one embodiment, vendor management officer 145a relies upon programmed instructions residing in recruitment vendor management system 140 to receive a resume that was posted in response to an already posted job description. In another embodiment, vendor management officer 145a passes received resume 115a to hiring manager 130a. In another embodiment, vendor management officer 145a distributes job description 135a to vendor 150a. In another embodiment, vendor management officer 145a distributes job description 135a to candidate 110a. In yet another embodiment, vendor management officer 145a creates job description 135a that includes at least one requirement.

In one embodiment, vendor management officer 145a may distribute resume 115a to hiring manager 130a whether resume 115a is a match for job description 135a or not. In another embodiment, vendor management officer 145a may not distribute resume 115a to hiring manager 130a whether resume 115a is a match for job description 135a or not. Additionally, in one embodiment, vendor management officer 145a may distribute job description 135a to vendor 150a or candidate 110a. In another embodiment, vendor management officer 145a may not distribute job description 135a to vendor 150a or candidate 110a.

Each requirement in job description 135a includes a skill or experience-related phrase that candidate 110a must possess and a minimum duration of time that candidate 110a has experience in the skill or experience-related phrase. Typically, a skill or experience-related phrase will appear in a resume in a context that implies a maximum possible duration of time that candidate 110a has practiced the skill or experience-related phrase (i.e., the duration of time is non-negligible). This mention of the skill or experience-related phrase might also occur when candidate 110a has studied the subject matter represented by the skill or experience-related phrase. Although the phrase might not belong to a job with a duration of experience, the skill or experience-related phrase might also be mentioned in resume 115a when candidate 110a is familiar with the phrase, has read about the phrase, or other reasons that deemed candidate 110a to include the phrase in resume 115a. If the context does not imply a duration of time (i.e., the duration of time is zero), the maximum duration of time associated with the skill or experience-related phrase will be set to zero. Thus, the skill or experience-related phrase will be attributed to the resume. However, the duration attributed to the skill or experience-related phrase will be negligible. Situations that will cause the maximum possible duration of time to be zero include candidate 110a attending a class or seminar on a particular subject matter, or being familiar with a subject matter, but having no formal experience with the subject matter. After creating a job, hiring manager 130a operates the hardware component to access recruitment vendor management system 140 via network 200 and review incoming resumes that were posted in response to a job that was previously created and stored in recruitment vendor management system 140. In another embodiment, hiring manager 130a operates the hardware component to access recruitment vendor management system 140 via network 200 to review resume 115a that was matched to job description 135a.

Figure 3:
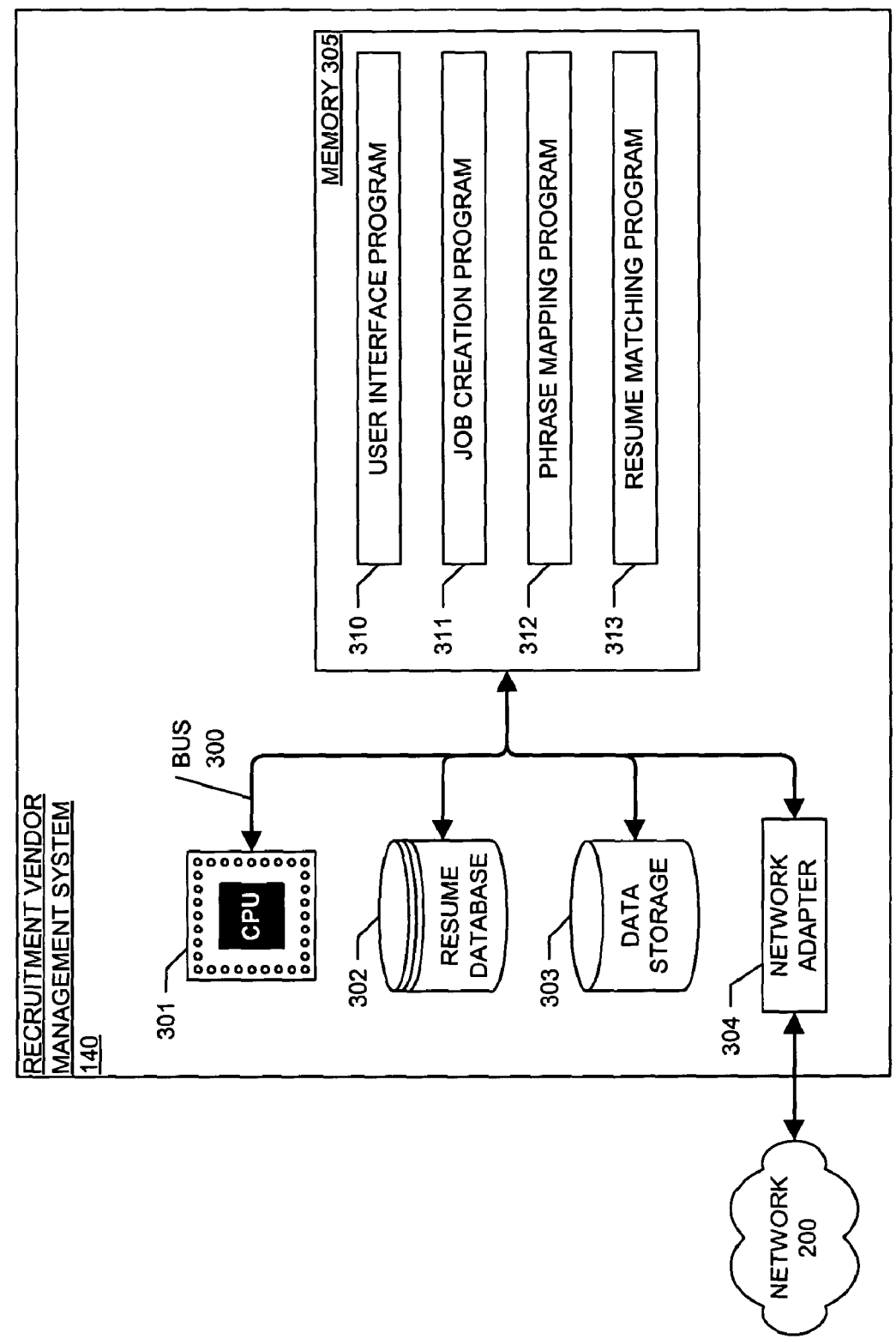
FIG. 3 is a block diagram that illustrates the hardware and software components comprising recruitment vendor management system 140 shown in FIG. 1 in accordance with one embodiment of the present invention.

FIG. 3 is a block diagram that illustrates the hardware and software components comprising recruitment vendor management system 140 shown in FIG. 1. Recruitment vendor management system 140 is a general-purpose computer. Bus 300 is a communication medium that connects central processing unit (CPU) 301, resume database 302, data storage 303, and network adapter 304 to memory 305. Network adapter 304 also connects to network 200 and is the mechanism that facilitates the passage of network traffic between recruitment vendor management system 140 and network 200. CPU 301 performs the disclosed methods by executing the sequences of operational instructions that comprise each computer program resident in, or operative on, memory 305.

FIG. 3 illustrates resume database 302 and data storage 303 as separate devices however, it is to be understood that another embodiment is to store the data in a single physical device that includes a separate logical partition for resume database 302 and data storage 303. FIG. 3 also illustrates resume database 302 and data storage 303 as internal devices however, it is to be understood that in another embodiment these devices may each be external to recruitment vendor management system 140 and accessible via a network connection. Additionally, in another embodiment, resume database 302 and data storage 303 may reside on one or more internal and external hardware components. In one embodiment, resume database 302 utilizes a relational database management system such as Oracle 9i (version 9.2) by Oracle™. Another embodiment of resume database 302 may utilize a different database management tool that is either homegrown or publicly available and traded. Another embodiment of resume database 302 may utilize an object-oriented database management system such as FrameD, open source software provided by SourceForge.net.

In one embodiment, the configuration of memory 305 includes user interface program 310, job creation program 311, phrase mapping program 312, and resume matching program 313. These computer programs store intermediate data in memory 305 and transmit data via bus 300 for storage in resume database 302 or data storage 303. It is to be understood that in another embodiment the configuration of memory 305 may not simultaneously include these programs. CPU 301 coordinates loading a program when it is needed, storing intermediate results, transferring data from one program to another, and unloading the program when it is no longer needed.

User Interface Program

User interface program 310 is a web-based graphical user interface such as a Hypertext Markup Language (HTML) web page that is accessible using a general-purpose Hypertext Transfer Protocol (HTTP) web browser such as Netscape Communicator, Microsoft Internet Explorer, or Mosaic. In another embodiment, user interface program 310 is a standalone application program implemented using an interface tool such as Java or Microsoft Visual Basic. In another embodiment, user interface program 310 is a user interface program that interfaces with job creation program 311, phrase mapping program 312, resume matching program 313, and performs the user interface for each hardware component shown in FIG. 2.

Job Creation Program

Job creation program 311 enables hiring manager 130a to utilize user interface program 310 to enter job description 135a and the requirements that a potential candidate should possess to be a match for the entered job. In another embodiment, job creation program 311 enables vendor management officer 145a to utilize user interface program 310 to enter job description 135a and the requirements that a potential candidate should possess to be a match for the entered job. Job creation program 311 stores the entered data in job table 420. In another embodiment, job creation program 311 activates resume matching program 313 to determine whether a posted resume is a match to the entered job. In one embodiment, when resume 115a arrives, the system examines the resume to determine whether it matches job description 135a in job table 420. In one embodiment when resume 115a arrives, recruitment vendor management system 140 automatically alerts vendor management officer 145a of the arrival of resume 115a and informs vendor management officer 145a whether resume 115a is a match to job description 135a. In one embodiment when resume 115a arrives, recruitment vendor management system 140 automatically alerts hiring manager 130a of the arrival of resume 115a and informs hiring manager 130a whether resume 115a is a match to job description 135a. In one embodiment, vendor management officer 145a can review resume 115a and send it to hiring manager 130a or flag resume 115a for future reference. In another embodiment, after reviewing resume 115a, vendor management officer 145a does not send resume 115a to hiring manager 130a and does not flag resume 115a for future reference. In one embodiment, hiring manager 130a may arrange to interview candidate 115a. In yet another embodiment, hiring manager 130a may not arrange to interview candidate 115a.

In one embodiment, job creation program 311 allows hiring manager 130a to clone a job. Hiring manager 130a will be able to enter or create a job similar to an existing job upon the click of a button. In another embodiment, job creation program 311 allows vendor management officer 145a to clone a job. Vendor management officer 145a will be able to enter or create a job similar to an existing job upon the click of a button. The cloning will create a new job with the same job description and requirements of the cloned job. The new job will have the cloning date for the creation date and will not share notes and job activities with the original job.

Job creation program 311 permits hiring manager 130a to enter the criteria as a Boolean phrase of skill or experience-related phrases very similar to the data entry for search engines found in prior electronic systems. Job creation program 311 then converts the Boolean phrase into an intuitive layout of a list of required skill or experience-related phrases and possible alternative skill or experience-related phrases. In another embodiment, job creation program 311 permits hiring manager 130a to enter the criteria as the list of required skill or experience-related phrases and possible alternative skill or experience-related phrases. Job creation program 311 then converts the intuitive layout of a list of required skill or experience-related phrases and possible alternative skill or experience-related phrases to a Boolean phrase. The requirement data entered in job creation program 311 contains the criteria to which candidate 110a, whose resume is 115a, should fulfill in order to be a match for the job.

In another embodiment, job creation program 311 accepts mandatory criteria to which the qualifications of the matching submitted resume should adhere and optional similarly laid-out criteria to which the qualifications of the resulting resumes should not adhere. A resume adhering to the second criteria will not be a match to the job even if it adhered to the required first criteria.

In another embodiment, job creation program 311 accommodates educational requirements in its matching criteria. Hiring manager 130a can specify the required level of education and field of specialization.

In another embodiment, job creation program 311 accommodates dollar rate requirements in its matching criteria. Hiring manager 130a can specify a range of required rates.

A job requirement contains required phrases and alternative required phrases. A few examples of skill or experience-related phrases are "Utilized Java and Oracle", "Utilized", "Java", "and", "Oracle", "Utilized Java", "Java and", "and Oracle", "Utilized Java and", "Java and Oracle", and "Utilized Java and Oracle". Recruitment vendor management system 140 considers each such phrase as a "skill or experience-related phrase". A skill or experience-related phrase includes or describes a skill, job location, title, department, responsibility, duty, action, achievement, accomplishment, relationship, product, consultation, group, team, field, space, area of endeavor, company, industry, technical package, or tool.

Phrase Mapping Program

Phrase mapping program 312 maps all experience-related phrases to their possible synonyms and to their narrow terms or narrow phrases. An experience-related phrase includes, but is not limited to skills that are required by the job, all functions that are required by the job, and all other terms, acronyms, or phrases used in defining a job requirement of a job description. The information and narratives in the job requirement comprise statements or phrases that include one or more words or terms where a word or a term comprises one or more characters, numbers, or symbols. Additionally, the word or the term would be the first word of the requirement, the last word of the requirement, and can be preceded or trailed by a delimiter such as a space or non-alphanumeric character. Phrase mapping program 312 maps the phrase comprising the job requirement to its possible synonym and narrow terms in the English language. The job requirement will then comprise of an original phrase. Synonyms and narrow phrases of the original phrase can substitute the original phrase in fulfilling the requirement placed on the original phrase. A narrow term or phrase is a term or a phrase that implies another term or phrase. For instance, "soldier" is a narrow term for "human", "lending officer" is a narrow term for "banker", and "psychiatrist" is a narrow term for "medical doctor" as well as "neurologist" is a narrow term for "medical doctor". Since "medical doctor" is a synonym for "physician", the phrase "medical doctor" is a narrow phrase for "physician" and "physician" is a narrow term for "medical doctor". The phrase "speaks Spanish very well" is a synonym for the phrase "fluent in Spanish" and therefore, both phrases are narrower than each other. However, "Spanish author" is a narrow phrase for "fluent in Spanish". Phrase A is a narrow term or phrase of phrase B when phrase A implies phrase B. Additionally, phrase A is a narrow term or phrase of phrase B when phrase B is a broad term or phrase of phrase A.

Phrase mapping program 312 is activated to map newly introduced mappings to mapping table 430. When tallying the duration of experience that candidate 110a has in a phrase, recruitment vendor management system 140 will not duplicate calendar time. In other words, a date will not be counted more than once when tallying the experience of an original phrase and its derived narrow phrases to arrive at the maximum possible duration of experience for the original phrase. If a job assignment description of resume 115a contains the phrase "Java" and its mapped narrow phrase "JSP", recruitment vendor management system 140 will not add to the maximum-total-duration of "Java" any duration contributed to by the existence of "JSP" in the mentioned experience range of the job assignment description. Conversely, if "Java" is not explicitly listed in the job assignment description, the introduction of a mapping making "JSP" a narrow phrase of "Java", will cause the recruitment vendor management system 140 to add the experience range of the job assignment description containing "JSP" to the maximum-total-duration of "Java".

In one embodiment, the job assignment description or experience portion of a resume begins on the line that includes the start-date of a date range (e.g., "Oct. 1, 1999-Nov. 24,2001" or "Oct. 1, 1999-Nov. 24, 2001") and ends one line before the line that includes the next start-date. The experience range for the job assignment will be the difference between the start date and the end date. In another embodiment, the job assignment description ends at the end of the resume or one line that starts a resume section that is not a job assignment description. In another embodiment, the experience range for the job assignment description is stated in the description. The recruitment vendor management system 140 will parse numerous layouts of date ranges including those that might appear on one, two, or three lines. Date ranges would initiate job assignment experiences once the program determines that they belong within the experience portion of the resume. The verbiage of a job assignment description may also end when headings on non-job related matters appear. Such headings may include education, references, and hobbies.

Skill or experience-related phrases in a job assignment description can range from one to any number of consecutive words. The experience range of a job assignment description (or experience) is an attribute assigned to each of the skill or experience-related phrases within that job assignment description. The length of time associated with the appearances of the skill or experience-related phrase in multiple assignment descriptions are tallied to compute a total duration for the skill or experience-related phrase. By definition and inference, this total duration for each phrase represents the total duration of experience the owner of the resume could have had in the phrase describing, for example, a skill, job location, title, department, responsibility, duty, action, achievement, accomplishment, relationship, product, consultation, group, team, field, space, area of endeavor, company, industry, technical package, or tool. In one embodiment, the total duration of all the jobs in which a skill or experience-related phrase appears in resume 115a of candidate 110a is the maximum duration of experience candidate 110a could have possibly had in the skill or experience-related phrase. This maximum possible duration of experience is referred in this disclosure as the maximum-total-duration. The "maximum-total-duration" refers to the maximum possible duration of experience in a skill or experience-related phrase that the candidate could have had in that phrase. In one embodiment, this maximum-total-duration is the total duration of all the job assignment descriptions in which the resume of the candidate contained the skill or experience-related phrase.

As previously defined, the term "maximum-total-duration" for each skill or experience-related phrase refers to the maximum duration per skill or experience-related phrase per resume, and therefore, per candidate. The "total" is for the possible multiplicity of jobs or experiences in which the skill or experience-related phrase or one of its narrow phrases appear, in resume 115a. Additionally, during an individual job assignment, candidate 110a could have used a skill or experience-related phrase contained in resume 115a for at most the total duration of the job assignment that contains the phrase. The total of all the duration of all the jobs that contain the experience-related phrase or one of its narrow phrases is the maximum-total-duration of experience in the phrase for candidate 110a.

The maximum-total-duration can be in any duration of time such as a number of seconds, minutes, hours, days, weeks, months, years, or decades. In another embodiment, the maximum-total-duration of a skill or experience-related phrase is the total duration of all the job assignment descriptions in which the resume of the candidate contained the skill or experience-related phrase or any of its narrow phrases. For example, a resume might have two jobs: one three-year job containing Java and another four-year job containing JSP. Let's say that mapping table 430 has Java as a broad phrase of JSP. Assuming that JSP does not appear in the three-year job, the maximum-total-duration of JSP is four years while Java is seven years.

When recruitment vendor management system 140 receives a job description comprising many job requirements for various skill or experience-related phrases, recruitment vendor management system 140 maps the original required phrases to their narrow phrases. If contained in the resume, each of the narrow phrases becomes an equal substitute to the original phrase in satisfying the duration of the job requirement. Without overlapping any of the dates within the tallied experience ranges, the tallying of all of the maximum-total-duration of all the narrow phrases plus the maximum-total-duration of the original phrase amount to the maximum-total duration of the original skill or experience-related phrase. By recursion, this mapping and implication process of the original required phrase is repeated until the entire original and derived experience-related phrases in the job requirement have been mapped to all their possible and available narrow phrases. This mapping process refers to mapping table 430 as the thesaurus for extracting the narrow phrases. The tallying of the maximum-total-duration of experience accounts for the duration of the original skill or experience-related phrase that possibly appeared in the resume and all the substitute derived narrow phrases that could have appeared in the resume.

Excluding overlapping portions of experience ranges, the maximum-total-duration of the original skill or experience-related phrase is the summation of all the experience ranges that contained the original skill or experience-related phrase or its substitute narrow phrase.

In one embodiment, an original skill or experience-related phrase might not even exist in a job assignment description of a resume that contains a narrower experience-related phrase. But still, the maximum-total-duration of the narrower skill or experience-related phrase will contribute to the maximum-total-duration of experience in the original phrase.

Recruitment vendor management system 140 parses resume 115a to identify, among other things, the beginning and end of the experience portion of resume 115a. The beginning of the experience portion occurs when the word "experience," or a synonymous word or phrase, appears as a heading in resume 115a. In another embodiment, the beginning of the experience portion occurs at the start of resume 115a. The experience portion of resume 115a by-passes narratives on education, objective, references, hobbies, summary of skills, name, address, phone numbers, electronic mail address, awards, non-experience-related achievements, non-experience-related accomplishments, and other narratives that do not define experience over a specified duration of time. The end of the experience portion occurs either when recruitment vendor management system 140 reaches the end of the resume or when a heading appears such as education, references, hobbies, or other headings that are not related to experience.

A job assignment description is all the text that starts with the line that includes the start-date and ends at the line before the line that includes the next start-date. In one embodiment, a job assignment description in resume 115a ends at the end of resume 115a. In another embodiment, a job assignment description in resume 115a ends one line before the appearance of a non-experience-related heading like references, education, or hobbies in resume 115a. In one embodiment, the start-date and end-date for a job assignment description in resume 115a appear on one line with a separator in between. The separator can be a space, a character, or a term or a phrase that means "to" (e.g., "Oct. 1, 1999 to Nov. 24,2001" or "Oct. 1, 1999-Nov. 24, 2001"). In another embodiment, the start-date, separator, and end-date of a job assignment description in resume 115a appear on two or three consecutive lines respectively. When only two lines are used the separator might be a null, implied by a carriage-return or line-feed, a hidden or unprintable character, or non-existent. The maximum duration for any skill or experience-related phrase that appears in the description of that employer or job assignment is the duration of time between the start-date and the end-date. If an experience range is not present in the resume, then recruitment vendor management system 140 sends an electronic message to vendor 150a or candidate 110a requesting the inclusion of date ranges for each of the job assignment descriptions via user interface program 310. In another embodiment, after receiving the electronic message sent by recruitment vendor management system 140, candidate 110a or vendor 150a can edit resume 115a on client computer 210 or client computer 230 and retransmit resume 115a to recruitment vendor management system 140.

Resume Matching Program

Resume matching program 313 determines whether resume 115a matches job description 135a. Resume matching program 313 uses the criteria of job requirements from job description 135a to determine whether resume 115a is a match. Resume matching program 313 is automatically activated when resume 115a is posted on recruitment vendor management system 140. In another embodiment, resume matching program 313 is activated by a user utilizing user interface program 310. In yet another embodiment, when job description 135a gets posted, resume matching program 313 tries to match job description 130a to previously posted resumes. Resume matching program 313 informs the user whether resume 115a is a match to job description 135a or not. The user could be candidate 110a, vendor 150a, vendor management officer 145a, or hiring manager 130a.

Figure 4:
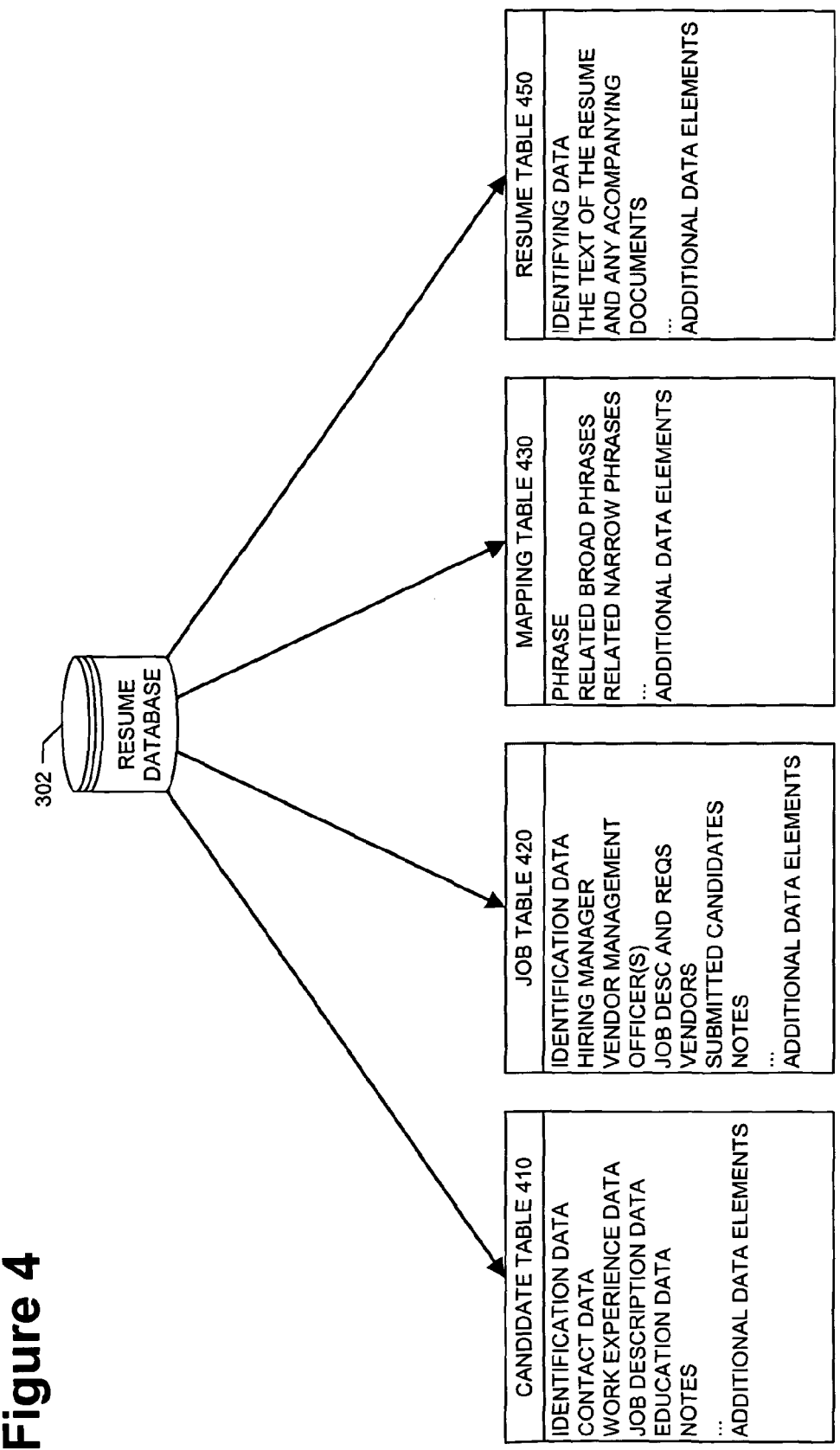
FIG. 4 is an exemplary database structure for resume database 302 shown in FIG. 3 in accordance with one embodiment of the present invention.

FIG. 4 is an exemplary database structure for resume database 302 shown in FIG. 3. Resume database 302 comprises candidate table 410, job table 420, mapping table 430, and resume table 450. In another embodiment, the system distributes the tables that comprise resume database 302 among several computers configured to service recruitment vendor management system 140. In another embodiment, resume database 302 includes tables containing candidate activities and notes, job activities and notes, tables for the hiring manager, vendor, and vendor management officers, and level of authorization, activities, and notes, as well as joining tables to optimize the storage and performance of the system for an ideal normalization level. The distributed architecture will improve load balancing by distributing the processing required to populate, search, maintain, and backup the database.

Candidate Table

Candidate table 410 stores information related to each candidate such as data extracted from the candidate's resume, data entered by the candidate or the vendor on behalf of the candidate, and notes and recruitment activities pertaining to the candidate. It is to be understood that the elements shown in candidate table 410 are exemplary and that candidate table 410 comprises additional data elements that are not shown. The data extracted from the candidate's resume and the data entered by the candidate or a vendor on behalf of the candidate includes, but is not limited to, personal identification and contact information, work experience data, job assignment descriptions, education credentials, job skills, and other experience-related phrases. In one embodiment, the notes comprise a synopsis of conversations, the candidate's interview schedule, and the candidate's availability status. In one embodiment, hiring manager 130a and vendor management officer 145a have full access to the data that is stored in candidate table 410 on candidate 110a. In another embodiment, hiring manager 130a and vendor management officer 145a have limited access to such information.

Job Table

Job table 420 stores information related to each job opening including, but not limited to, job description, job requirements, hiring manager, notes among others. It is to be understood that the elements shown in job table 420 are exemplary and that job table 420 comprises additional data elements that are not shown. In one embodiment, job table 420 contains the vendor management officer's name or reference number. In another embodiment, job table 420 contains a list of candidates who are submitted to the job and the status or pertaining activities on each. In another embodiment, job table 420 contains the hiring manager contact information, the vendor identification information, the vendor management officer's identification information, the job description that contains, but is not limited to, the requirements for the job, and the notes and recruitment activities pertaining to the job. In one embodiment, the requirements for the job include the work location, the duration of the job assignment, and the pay scale. In another embodiment, each of the requirements for the job also include required skill or experience-related phrases and the required minimum duration of experience for each required skill or experience-related phrase. In another embodiment, the duration of experience in a skill or experience-related phrase is required to be obtained at a specific time-range. In one embodiment, a job may have one requirement. In another embodiment, a job may have several requirements. In yet another embodiment, one or more of the job requirements may have one or more alternative job requirements for each job requirement, where a requirement can also be satisfied by any alternative. In one embodiment, the job description and requirements allow for the exclusion of candidates who fit criteria similar to the criteria specified herein as the required candidate's inclusion criteria. Other inclusion and exclusion conditions may include geographic locations (e.g., state name), area codes, salary ranges, and educational levels. The notes relating to candidates for the job include a synopsis of conversations between the candidate, the vendor, the vendor management officer, and the hiring manager as well as a list of the interviewees and activities pertaining to the job.

Mapping Table

Mapping table 430 retains the broad and narrow phrases of phrases encountered by job description 135a. It is to be understood that the elements shown in mapping table 430 are exemplary and that mapping table 430 comprises additional data elements that are not shown. A definition of "phrase" includes one or more consecutive words. Phrase A is a broad phrase of phrase B when phrase B is a narrow phrase of phrase A. Additionally, phrase A is broad phrase of phrase B when phrase B implies phrase A. Likewise, phrase B is a narrow phrase of phrase A when phrase B implies phrase A. Phrase A and phrase B are synonymous when phrase A is a narrow and broad phrase of phrase B at the same time and vice versa. Additional discussion of mappings in this system is in the disclosure of phrase mapping program 312. Mapping table 430 attempts to include any phrase that might appear in a job description and that might have possible broad and narrow phrases. Mapping table 430 is utilized by phrase mapping program 312 as a thesaurus of phrases implying other phrases. In another embodiment, mapping table 430 includes the exceptions when a supposedly broad or narrow phrase is not broad or narrow because of context. For instance, experience in 'bank' does not imply banking experience when 'bank' appears in the resume in the context of 'data bank'. In another embodiment, mapping table 430 includes other exceptions when a supposedly descriptive term in a resume does not describe the candidate because of context. For instance, 'assisting a director' does not make the phrase 'director' an attribute to the resume or candidate because of context. In another embodiment, mapping table 430 includes other exceptions when a supposedly descriptive term in a resume does not describe the candidate because of contextual existence of another term or phrase. For instance, when the verb 'programmed in Java' appears within an experience range along with the term 'secretary' then the candidate is not a secretary and the term 'secretary' is no longer an attribute to the candidate. In another embodiment, mapping table 430 includes other exceptions when a phrase or a term in a resume does not represent itself, and therefore is not an attribute to the candidate and the resume, because of context. For instance, 'Java' is not 'Java' when it appears in 'Java Script'. This invention will not match a candidate to a requirement for Java because the candidate's resume has Java Script, assuming that everything else is equal.

Resume Table

Resume table 450 retains resume 115a in its original shape, form, and content. It is to be understood that the elements shown in resume table 450 are exemplary and that resume table 450 comprises additional data elements that are not shown. Resume table 450 retains an unaltered copy of resume 115a as it was received from the sender by recruitment vendor management system 140 whether resume 115a was electronically mailed, cut-and-paste, uploaded, bulk-loaded, or generated by a resume maker program for recruitment vendor management system 140. In one embodiment, recruitment vendor management system 140 converts the format of 115a to other forms and stores these other forms in resume table 450. In another embodiment, recruitment vendor management system stores multiple versions of resume 115a for candidate 110a. Any or all versions of resume 115a in resume table 450 gets displayed to the vendor management office or to the hiring manager or other users when and where applicable.

Figure 5:
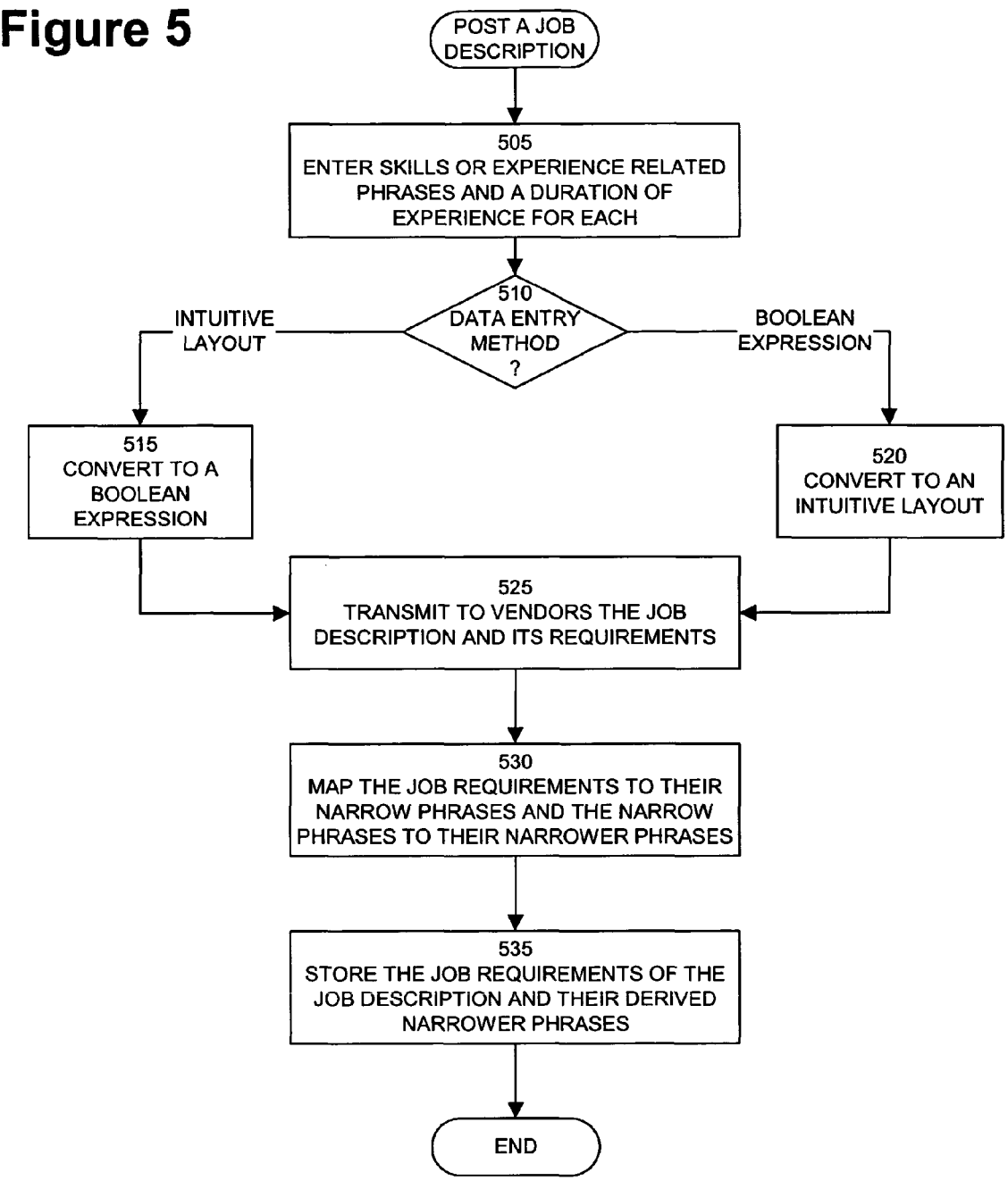
FIG. 5 is a flow diagram of an embodiment of recruitment vendor management system 140 receiving a job description for a job opening in accordance with one embodiment of the present invention.

FIG. 5 is a flow diagram of an embodiment of recruitment vendor management system 140 receiving job description 135a from hiring manager 130a. However, in another embodiment, vendor management officer 145a may enter job description 135a on behalf of hiring manager 130a. At step 505, hiring manager 130a enters a list of required skill or experience-related phrases and the required minimum duration of experience that is required in each required phrase for candidate 110a to be a match. In another embodiment, for each required skill or experience-related phrase, hiring manager 130a may specify a time-range during which the experience is obtained. In another embodiment, for each required skill or experience-related phrase in the list, hiring manager 130a may specify a list of alternative skill or experience-related phrases and the required minimum duration of experience for each of the alternative phrases. Each alternative of an original required skill or experience-related phrase can satisfy the job description whether the requirement for the original skill or experience-related phrase is satisfied or not. For example, in one embodiment hiring manager 130a may require a minimum of two years of Java experience and a minimum of five years of Oracle experience. In another embodiment, hiring manager 130a wishes to consider candidates with a minimum two years of experience in the Java programming language. However, for Java, hiring manager 130a may also list alternative skill or experience-related phrases such as one and a half years of experience in C++ or three years of experience in PASCAL. Thus, a matching candidate might possess either two years of experience in Java (the required skill or experience-related phrase), one and a half years of experience in C++ (a listed alternative), or three years of experience in PASCAL (another listed alternative). Hiring manager 130a may exclude candidates who meet similarly structured criteria of a different set or combination of experience-related phrases. For example, a candidate with two years in Java and either one and a half years in C++ or three years in PASCAL, but not to include those candidates who have two years in brokerage and one year of management or whose Java experience is over five years. In addition, hiring manager 130a may also list some attributes, such as educational level or field of specialization, geographic location, and desired salary, all of which are attributes that might be required of candidate 110a to be a match to the job.

Recruitment vendor management system 140 determines whether hiring manager 130a entered the job description in the intuitive layout or as a Boolean expression (step 510). If hiring manager 130a entered the search data in an intuitive layout, the process converts the search data to a Boolean expression (step 515) and displays both the intuitive layout and the Boolean expression to hiring manager 130a. If hiring manager 130a entered the search data as a Boolean expression, the process converts the search data to an intuitive layout (step 520) and displays both the Boolean expression and the intuitive layout to hiring manager 130a. Thus, whether the user chooses the intuitive layout or the Boolean expression as the method of data entry, recruitment vendor management system 140 converts the job description data to the other method of data entry and displays both forms of the job description expression to hiring manager 130a.

At step 525, recruitment vendor management system 140 communicates job description 135a to vendor management officer 145a. In another embodiment, recruitment vendor management system 140 communicates job description 135a to vendor 150a. In another embodiment, recruitment vendor management system 140 communicates job description 135a to candidate 110a. In yet another embodiment, recruitment vendor management system 140 alerts vendor management officer 145a, vendor 150a, or candidate 110a to retrieve job description 135a from recruitment vendor management system 140. At step 530, using mapping table 430, phrase mapping program 312 maps the job requirements contained in job description 135a to their narrow phrases and the narrow phrases to their narrower phrases and so on. At step 535, recruitment vendor management system 140 stores job description 135a and the job requirements of job description 135a and their derived narrower phrases in job table 420.

Figure 6:
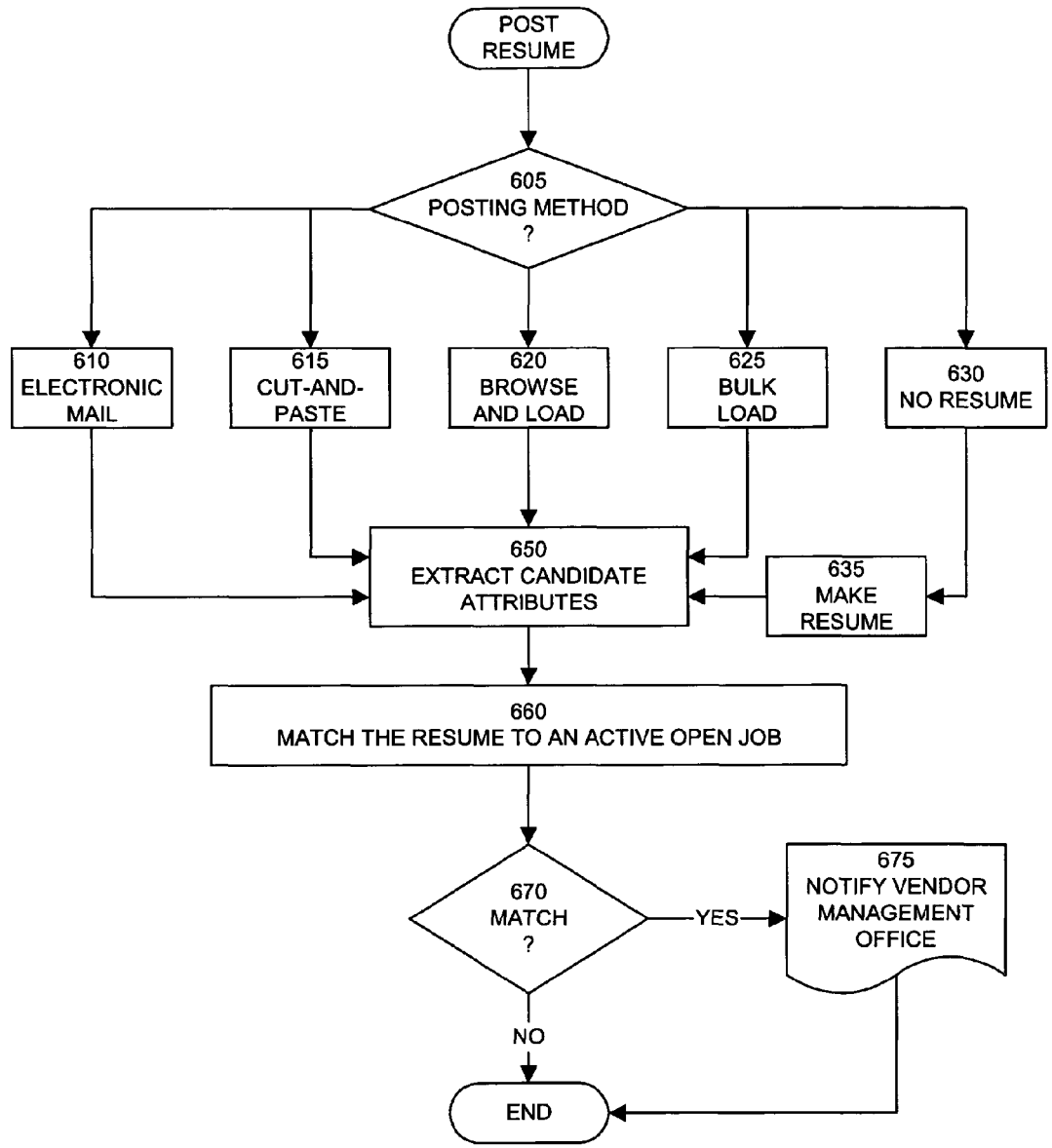
FIG. 6 is a flow diagram of an embodiment of recruitment vendor management system 140 receiving a resume in accordance with one embodiment of the present invention.

FIG. 6 is a flow diagram of an embodiment of recruitment vendor management system 140 initiating the posting of a resume. In one embodiment, vendor 150a initiates the posting of resume 115a. In another embodiment, candidate 110a initiates posting resume 115a. In yet another embodiment, vendor management officer 145a initiates posting resume 115a. Vendor 150a selects one method for posting resume 115a to recruitment vendor management system 140 (step 605). Recruitment vendor management system 140 accommodates vendor 150a sending the resume as an attachment to an electronic mail message (step 610) or making a digital copy of the resume in another application and pasting the digital copy into user interface program 310 (step 615). Recruitment vendor management system 140 also accommodates vendor 150a operating user interface program 310 to browse a file directory listing, select a file that includes the resume, and upload the resume to the recruitment vendor management system 140 (step 620). Recruitment vendor management system 140 also accommodates a user uploading at least one resume in a bulk upload (step 625) or, if candidate 110a does not have a prepared resume (step 630), operating recruitment vendor management system 140 to author a new resume (step 635). In another embodiment candidate 110a initiates posting resume 115a onto recruitment vendor management system 140 in any one of the above methods. In yet another embodiment, vendor 150a or vendor management officer 145a initiates posting resume 115a onto recruitment vendor management system 140 in any one of the above methods. After posting resume 115a using one of the method described above, recruitment vendor management system 140 extracts candidate attributes from resume 115a (step 650).

Resume matching program 313 of recruitment vendor management system 140 determines whether resume 115a matches job description 135a (step 660). In another embodiment, resume matching program 313 determines whether resume 115a is a match to any posted job description in recruitment vendor management system 140. Alternatively, recruitment vendor management system 140 notifies vendor management officer 145a, or hiring manager 130a whether there is a match.

If recruitment vendor management system 140 determines that resume 115a matches the requirements of job description 135a (step 670), recruitment vendor management system 140 proceeds to notify vendor management officer 145a or hiring manager 130a (step 675). In one embodiment, the notification means is an electronic mail message. In another embodiment, the notification means is an instant message. In another embodiment, the notification means is a notation on the job record pertaining to the job and the candidate. In another embodiment, the mortification means is a notation on the candidate table pertaining to the job and the candidate. However, any other method of communication of the match can be used. If recruitment vendor management system 140 does not recognize the resume as a match, the process ends and is recorded accordingly. Hiring manager 130a or vendor management officer 145a may still decide to look at unmatched resumes submitted to job description 135a and may further interview unmatched candidates.

In one embodiment, recruitment vendor management system 140 provides the user the capability of viewing one matched resume. In another embodiment, recruitment vendor management system 140 provides the user the capability of viewing any resume. In one embodiment, the system provides a split-screen view of a single frame comprising multiple portions. All portions are contained in a single frame that has common windowing characteristics. The frame can be opened, closed, maximized, minimized, moved, resized, contains a header, and can be in-focus or out of focus along with other possible characteristics. In one embodiment, one portion of the frame displays the candidate attributes like name, address, e-mail address, home phone number, work phone number, cell number, fax number, past salary, desired salary, education information, experience ranges, experience descriptions, notes on the candidate, and activities pertaining to consideration for employment. In another embodiment, one portion of the frame displays a list of resumes that are a match to job description 135a. In another embodiment, one portion of the frame displays a list of resumes that were submitted. In another embodiment, one portion of the frame displays a copy of the resume of candidate 110a. In one embodiment, the candidate attributes comprise the experience duration(s) that were held. In another embodiment, the candidate attributes comprise an abstract on each of the jobs held for each experience range. The resumes are displayed for each candidate to view by selecting one candidate's name from the list of the candidates displayed by recruitment vendor management system 140.

Although the disclosed embodiments describe a fully functioning recruitment vendor management system and method, it is to be understood that other equivalent embodiments exist. Since numerous modifications and variations will occur to those who review this disclosure, the recruitment vendor management system and method is not limited to the exact construction and operation illustrated and disclosed. Accordingly, this disclosure intends all suitable modifications and equivalents to fall within the scope of the claims.

I claim:

1. A graphical user interface, comprising:
    a first display region including a job description that includes at least one job requirement, each said at least one job requirement comprising a required skill or experience-related phrase and a required term of experience for the required skill or experience-related phrase; and
    a second display region including a matching resume that satisfies the job description,
    wherein, for each said at least one job requirement, the required skill or experience-related phrase is associated with at least one implying skill or experience-related phrase,
    wherein at least one searchable phrase is associated with each said at least one job requirement, one of said at least one searchable phrase including the required skill or experience-related phrase, and said at least one searchable phrase including each said at least one implying skill or experience-related phrase,
    wherein the matching resume is one of at least one resume,
    wherein each resume summarizes a candidate's career and qualification,
    wherein each resume conveys personal and business-related characteristics that the candidate believes to be relevant to a prospective employer,
    wherein each said at least one resume includes at least one skill or experience-related phrase, an experience range for each said at least one skill or experience-related phrase determined by examining a use of each said at least one skill or experience-related phrase in the resume, and a computed term of experience for each said at least one skill or experience-related phrase based on the experience range, and
    wherein the term of experience for each said at least one skill or experience-related phrase is a summation of the term of experience for each occurrence of the phrase associated with a different experience range.

2. The graphical user interface of claim 1, wherein the second display region further includes a marking for at least one occurrence of the searchable phrase for each said at least one job requirement.

3. The graphical user interface of claim 2, wherein the marking includes highlighting, displaying in reverse video, or displaying in a different font type, font size, or font style.

4. The graphical user interface of claim 2, further comprising:
    a third display region including a listing of said at least one resume.

* * * * *